(12) United States Patent
Schelstraete et al.

(10) Patent No.: US 9,698,878 B2
(45) Date of Patent: Jul. 4, 2017

(54) UNSOLICITED CHANNEL SOUNDING IN A WIRELESS LOCAL AREA NETWORK

(71) Applicant: Quantenna Communications, Inc., Fremont, CA (US)

(72) Inventors: Sigurd Schelstraete, Menlo Park, CA (US); Hossein Dehghan, Diablo, CA (US); Sam Heidari, Los Altos Hills, CA (US); Bahador Amiri, Los Gatos, CA (US)

(73) Assignee: Quantenna Communications, Inc., Fremont, CA (US)

( * ) Notice: Subject to any disclaimer, the term of this patent is extended or adjusted under 35 U.S.C. 154(b) by 169 days.

(21) Appl. No.: 14/741,419

(22) Filed: Jun. 16, 2015

(65) Prior Publication Data
US 2016/0127019 A1    May 5, 2016

Related U.S. Application Data

(63) Continuation-in-part of application No. 14/530,657, filed on Oct. 31, 2014, now Pat. No. 9,078,153.

(51) Int. Cl.
| | |
|---|---|
| H04B 7/06 | (2006.01) |
| H04B 17/309 | (2015.01) |
| H04W 64/00 | (2009.01) |
| H04B 7/0417 | (2017.01) |
| H04W 84/12 | (2009.01) |

(52) U.S. Cl.
CPC ......... *H04B 7/0417* (2013.01); *H04B 7/0626* (2013.01); *H04B 7/0645* (2013.01); *H04B 17/309* (2015.01); *H04W 64/003* (2013.01); *H04B 7/0617* (2013.01); *H04B 7/0634* (2013.01); *H04B 7/0665* (2013.01); *H04W 84/12* (2013.01)

(58) Field of Classification Search
CPC .......... H04W 24/02–24/10; H04B 7/06; H04B 7/0619–7/0667; H04B 17/30–17/373
See application file for complete search history.

(56) References Cited

U.S. PATENT DOCUMENTS

| | | | |
|---|---|---|---|
| 2009/0154588 A1* | 6/2009 | Chen ..................... | H04L 1/0026 375/267 |
| 2015/0222340 A1* | 8/2015 | Nagata .................. | H04W 16/28 375/267 |

(Continued)

*Primary Examiner* — Marcus R Smith
(74) *Attorney, Agent, or Firm* — IP Creators; Charles C Cary

(57) ABSTRACT

A transceiver for a wireless local area network (WLAN) and the transceiver including a sounding feedback module and a sounding feedforward module. The sounding feedback module is responsive to an explicit sounding from a transmitting one of the nodes to send feedback of multiple-input multiple-output (MIMO) channel state information (CSI) derived from the channel sounding to the transmitting one of the nodes for improving subsequent transmissions. The sounding feedforward module is configured to monitor changes in CSI since the last explicit sounding based on CSI determined from the subsequent transmissions of the transmitting one of the nodes and responsive to a determination of a change in CSI above a threshold amount, to feedforward to the transmitting one of the nodes indicia of the change in CSI.

16 Claims, 11 Drawing Sheets

Unsolicited Sounding

(56) References Cited

U.S. PATENT DOCUMENTS

2015/0373736 A1* 12/2015 Ji .................. H04B 7/2621
370/330
2016/0191128 A1* 6/2016 Jiang ................ H04L 1/0026
375/267

\* cited by examiner

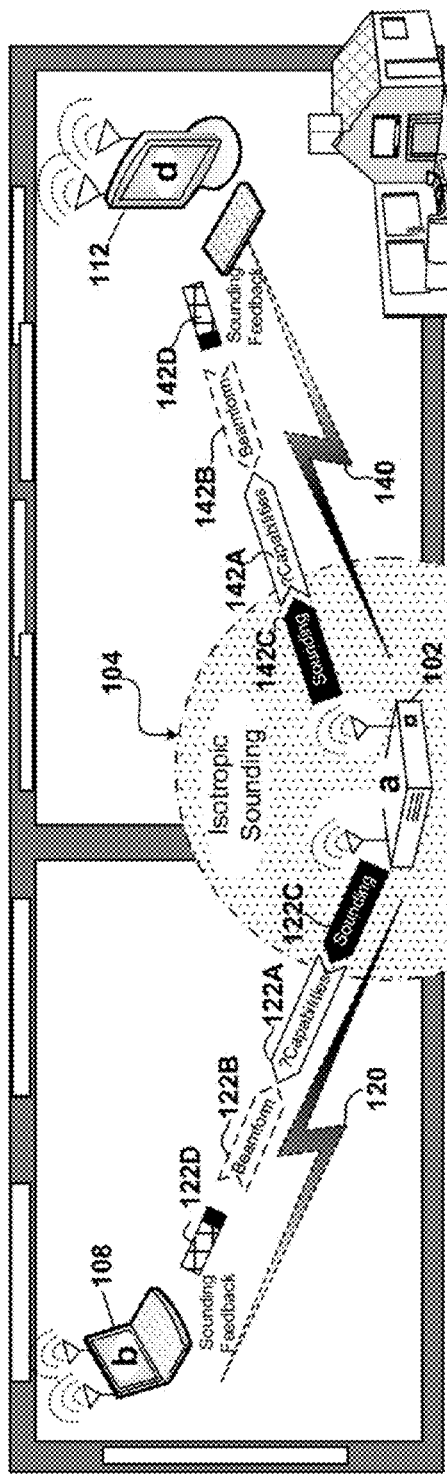
FIG. 1A   PRIOR ART   Channel Soundings => Ch. Matrices
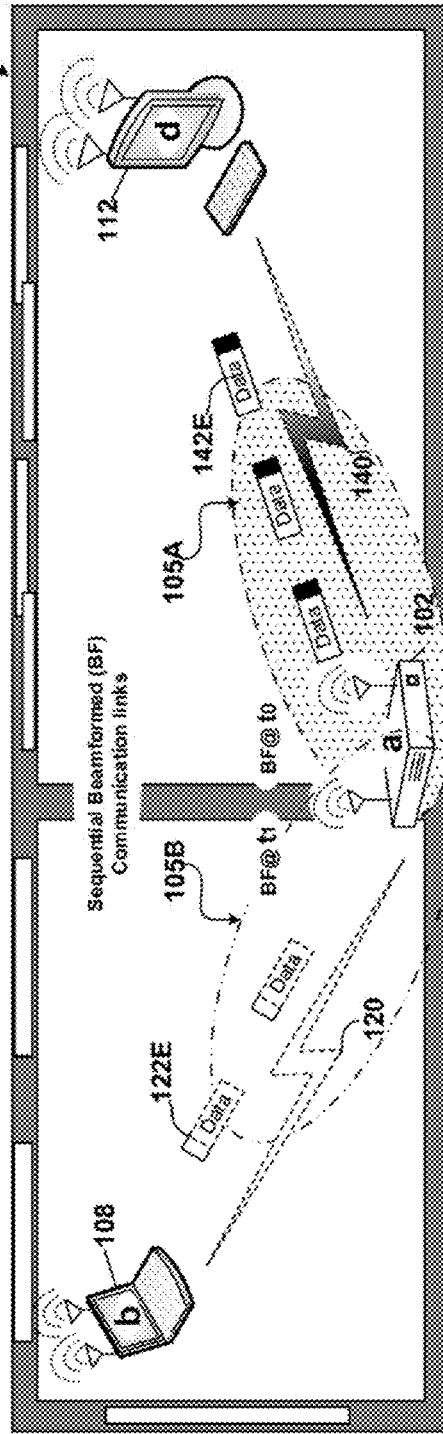
FIG. 1B   PRIOR ART   MIMO BeamSteered Communications <= Ch. Matrices

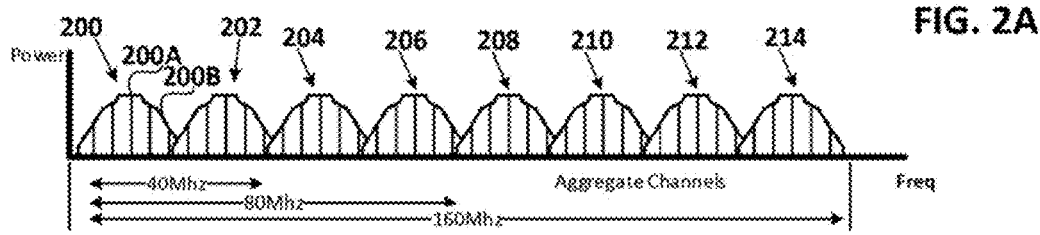
PRIOR ART  WLAN Channels
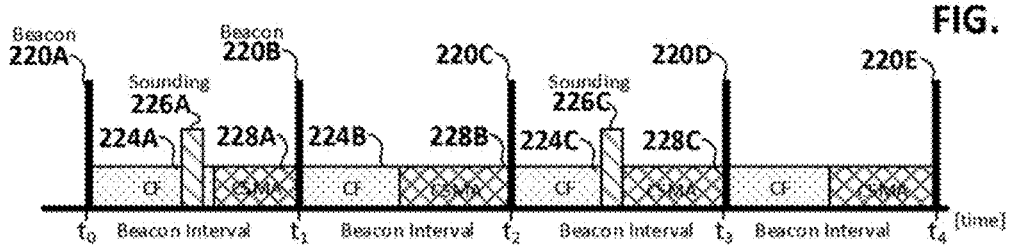
PRIOR ART  WLAN Activity
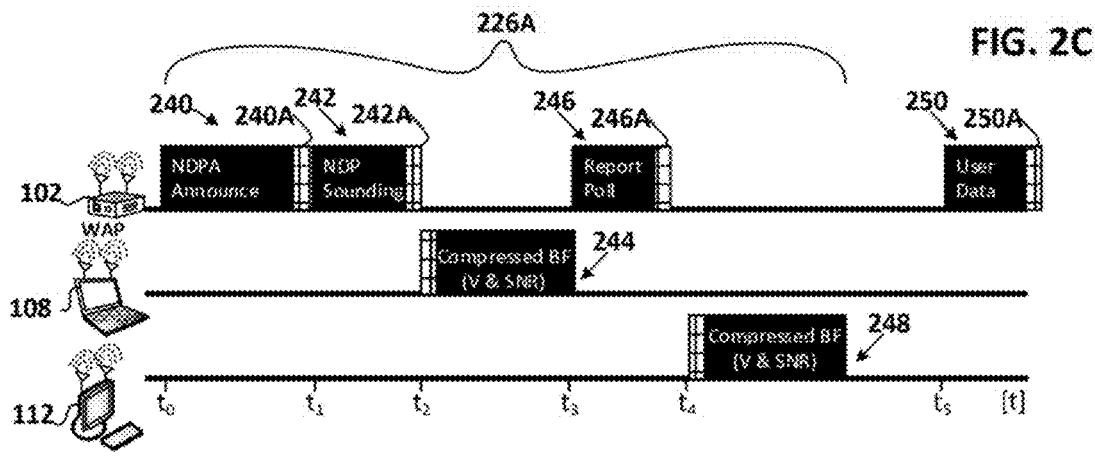
PRIOR ART  WLAN Sounding
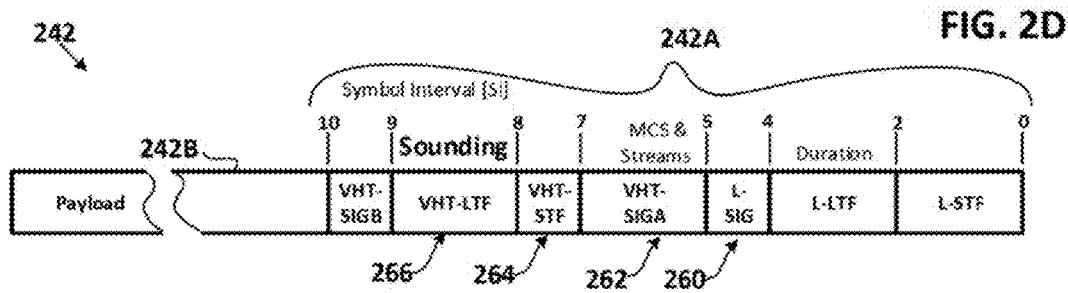
PRIOR ART  WLAN Packet Header

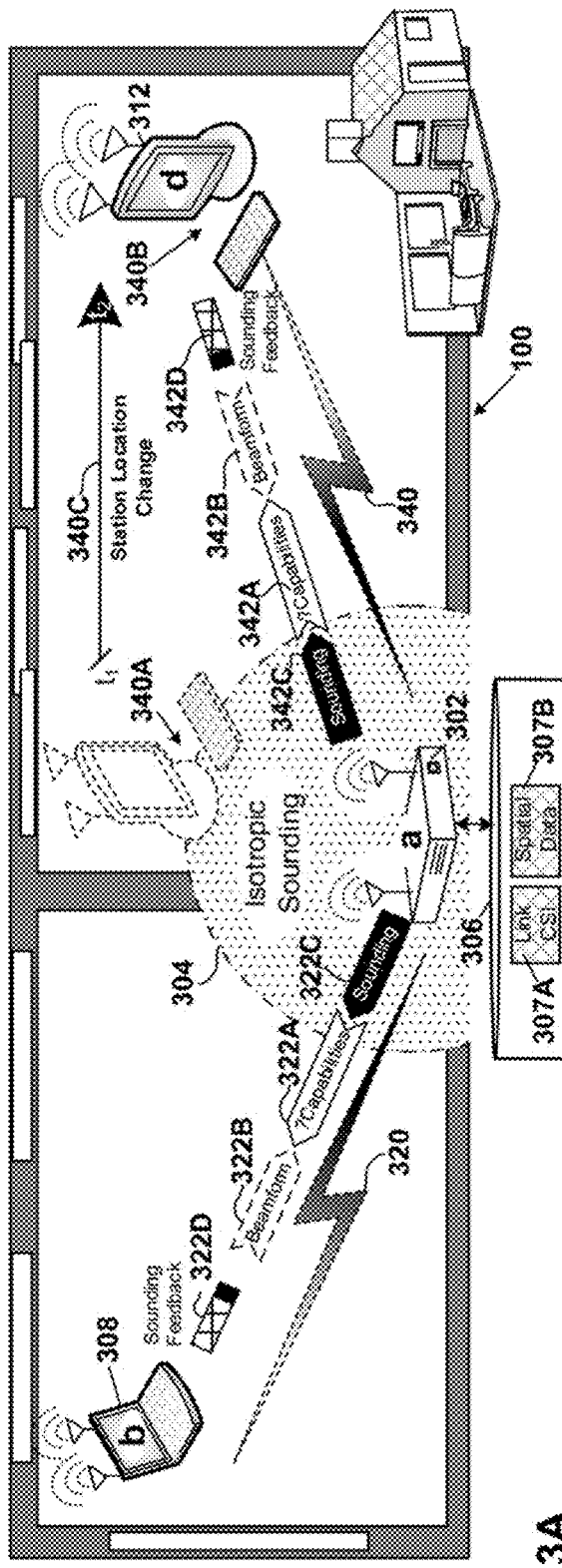
FIG. 3A
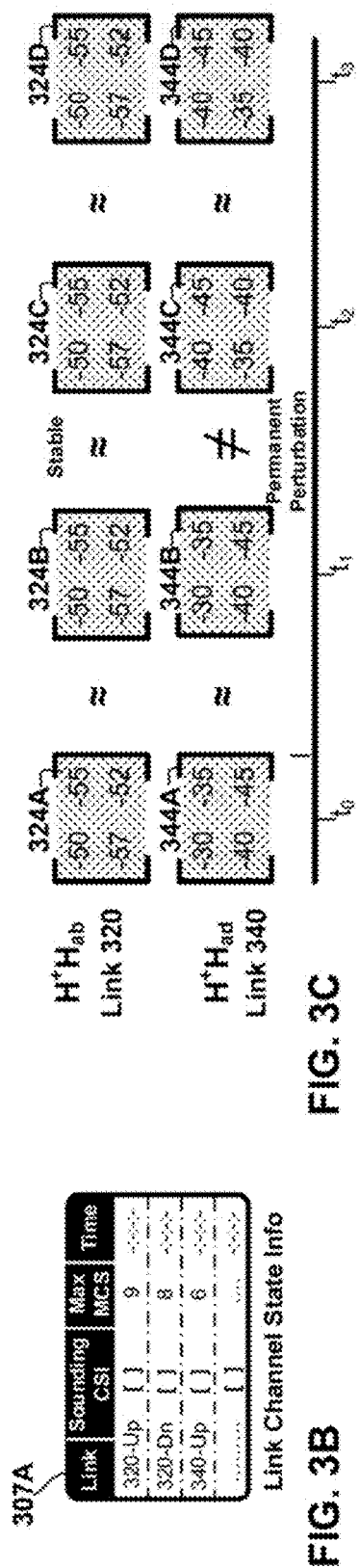
FIG. 3B
FIG. 3C

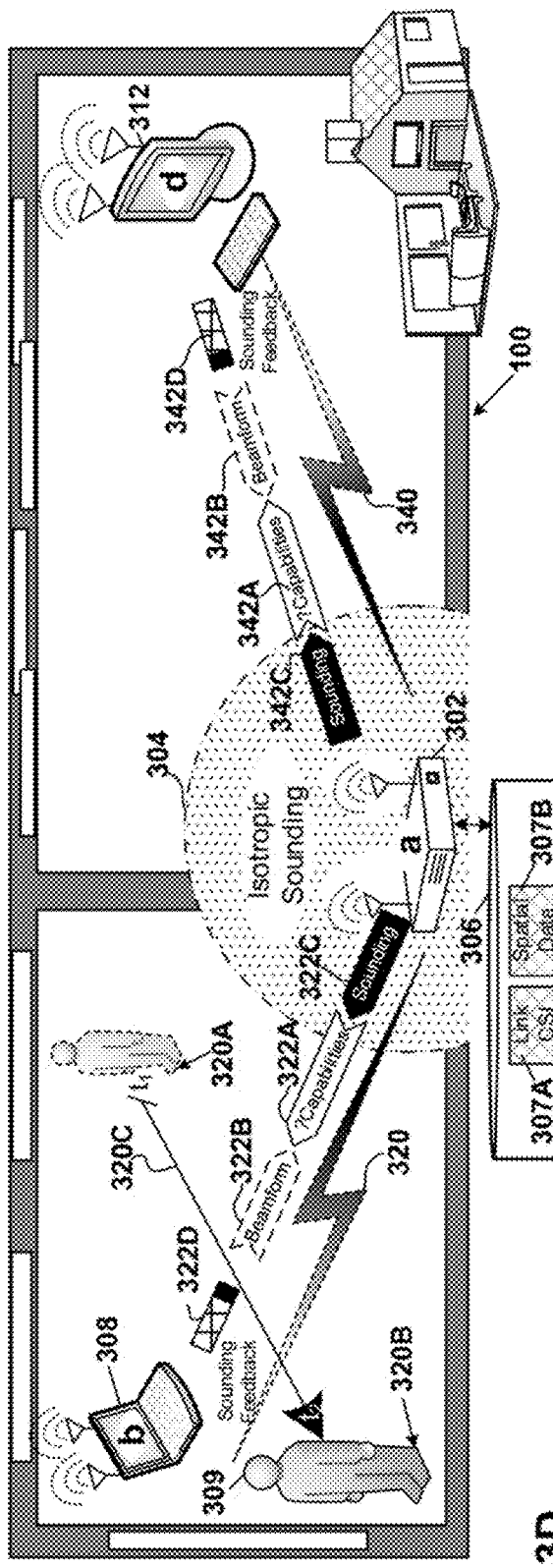
FIG. 3D
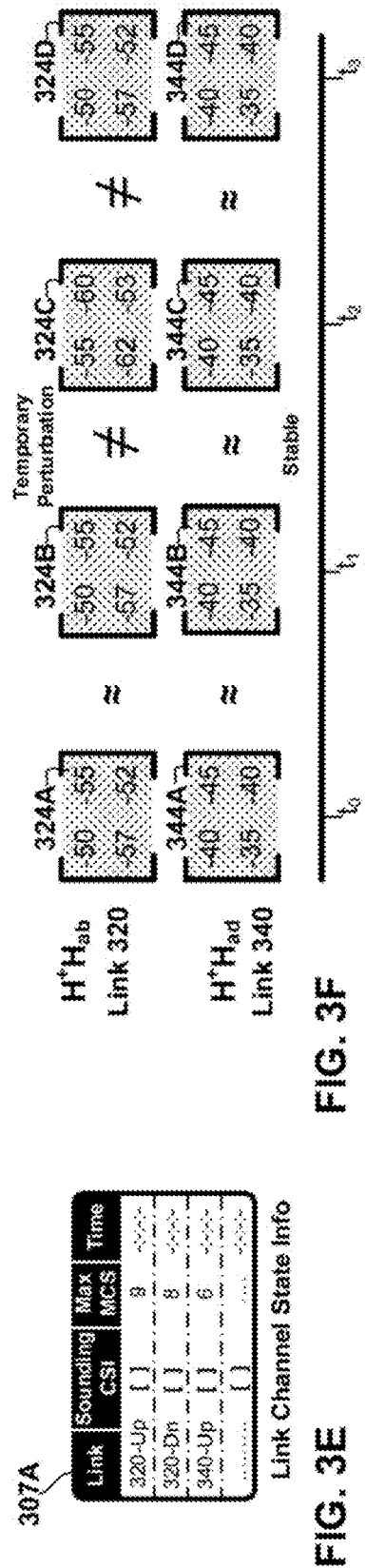
FIG. 3E
FIG. 3F

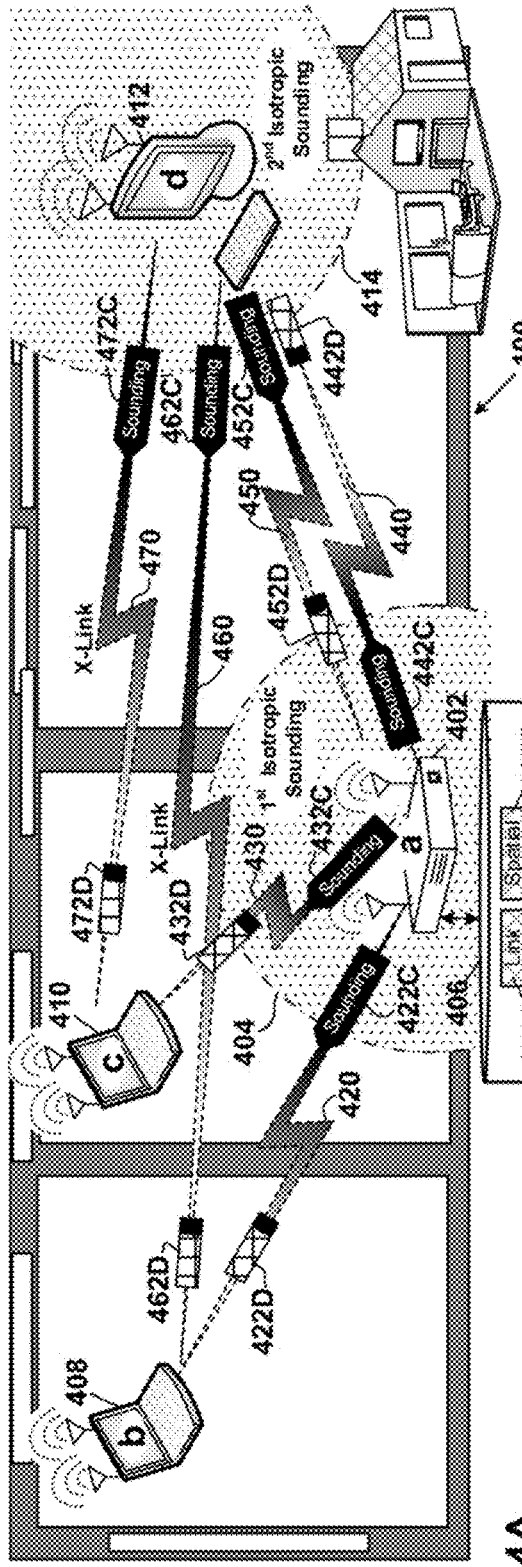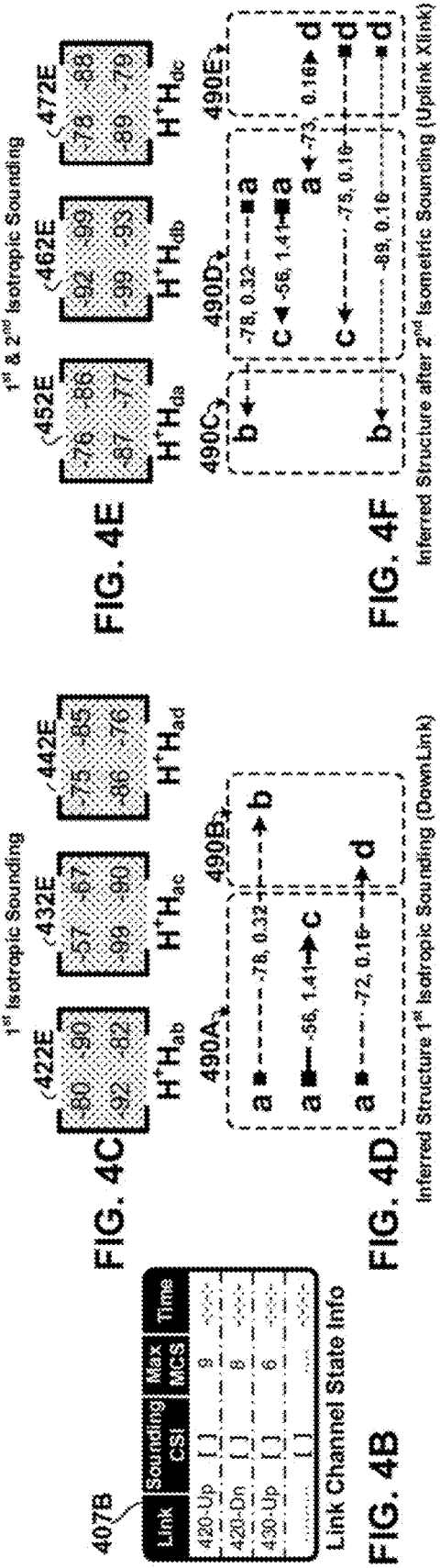

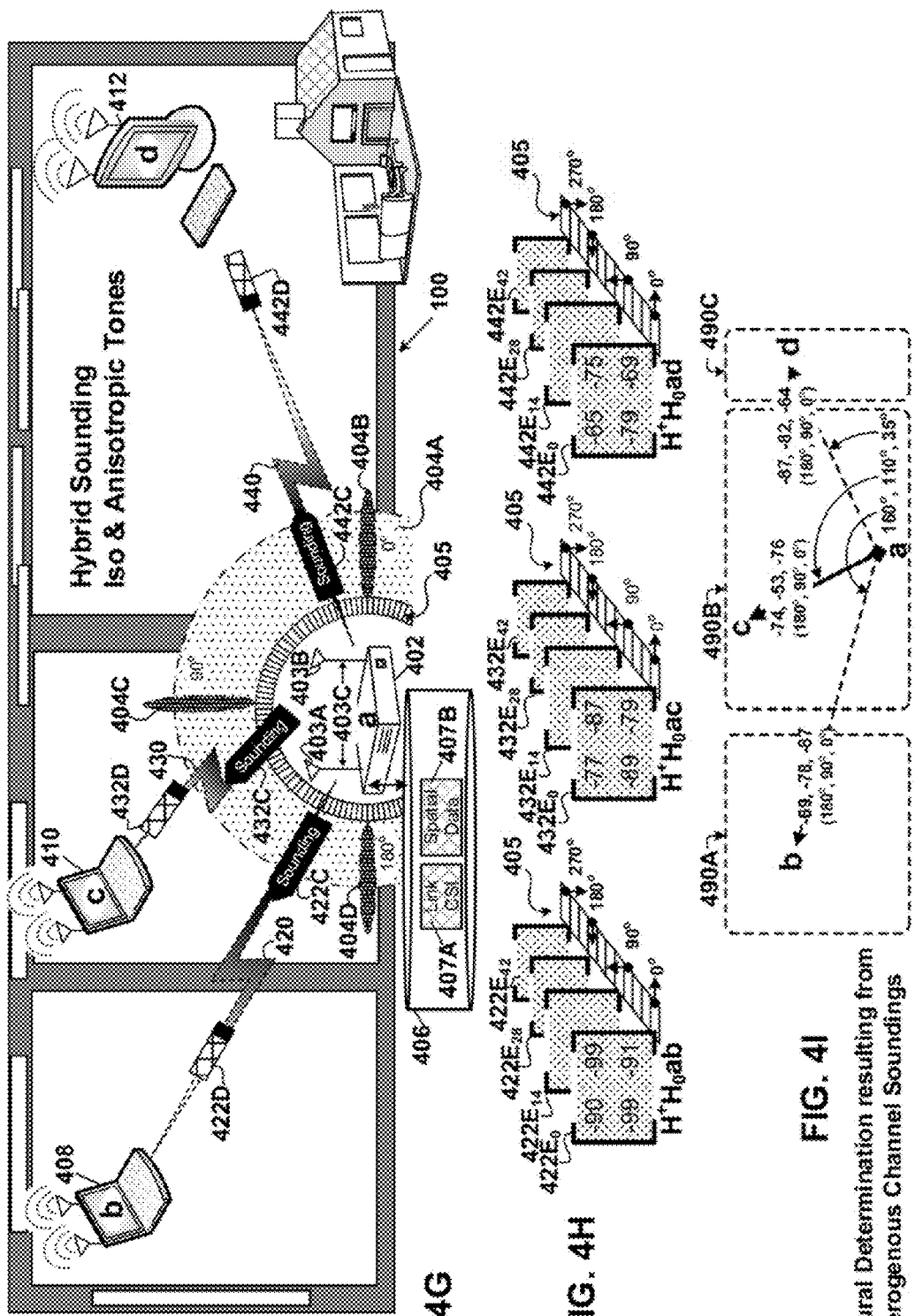

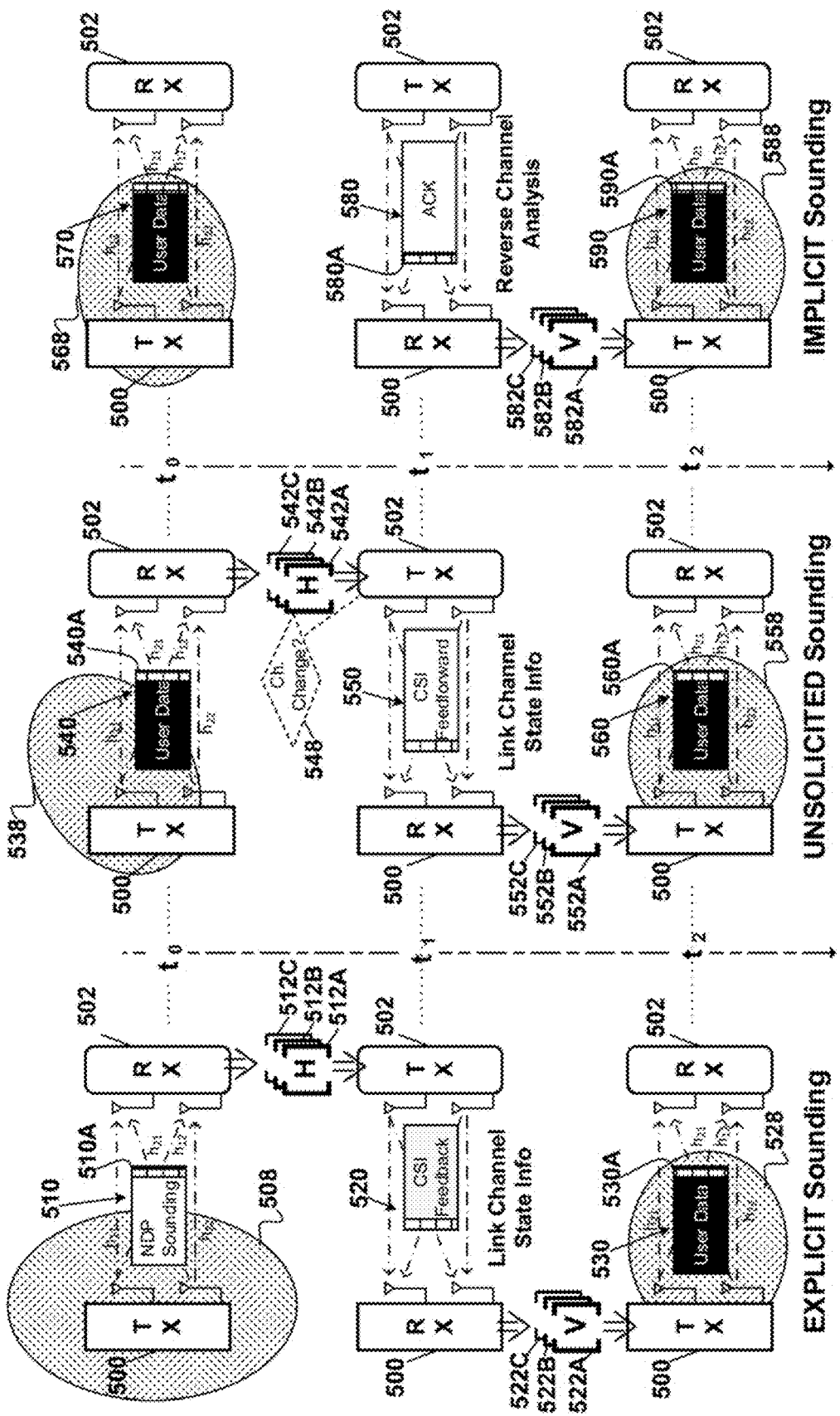

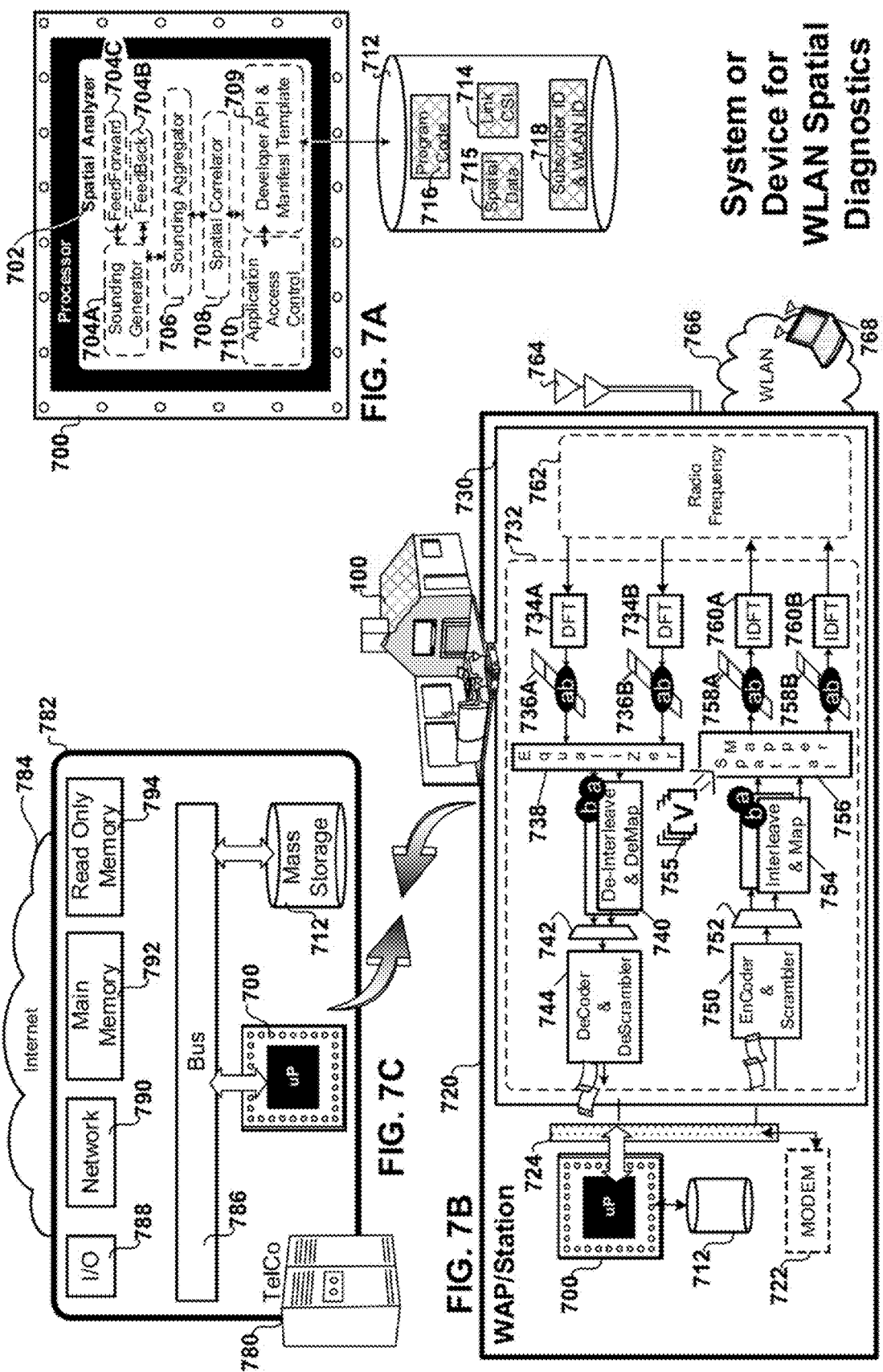

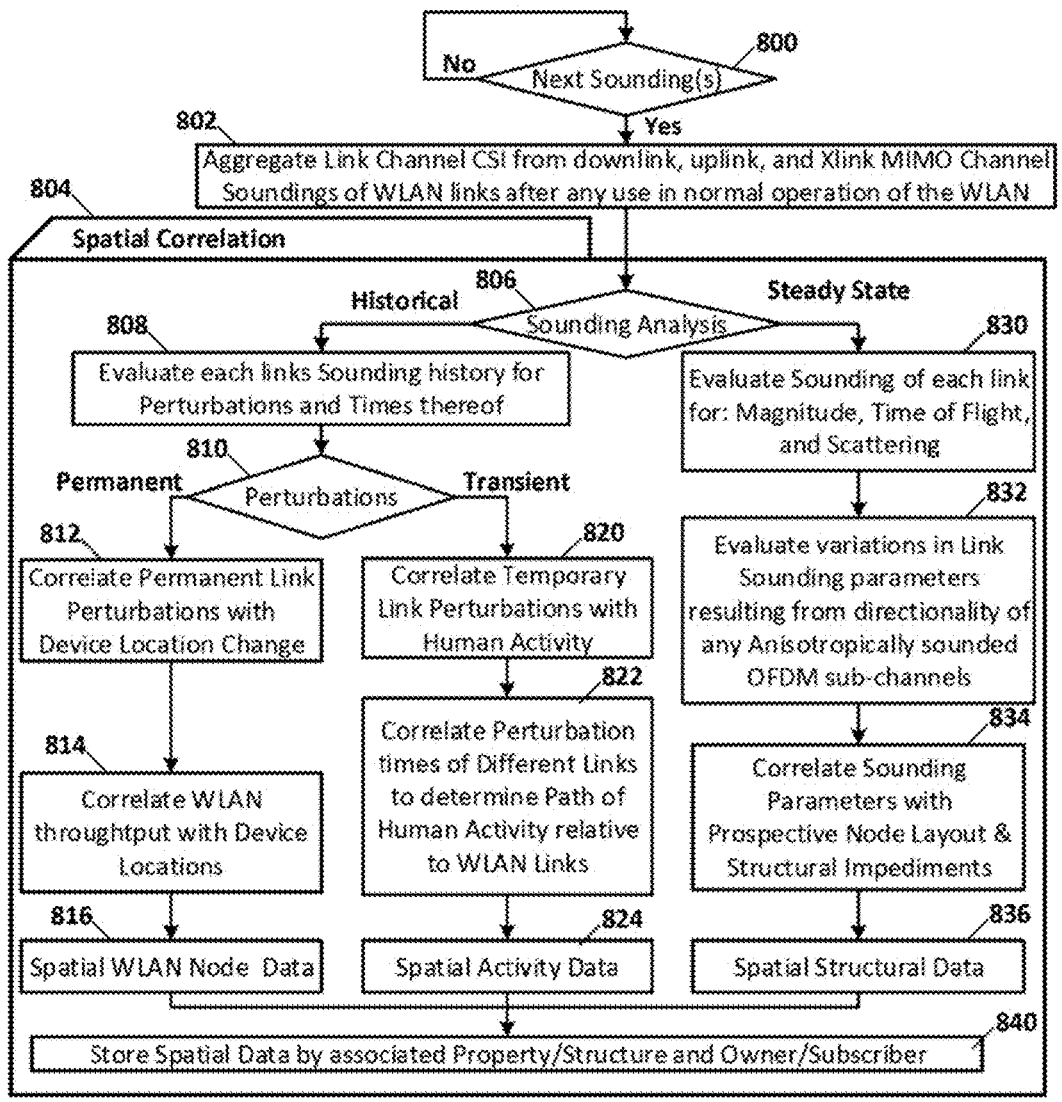
FIG. 8A      WLAN Spatial Diagnostics
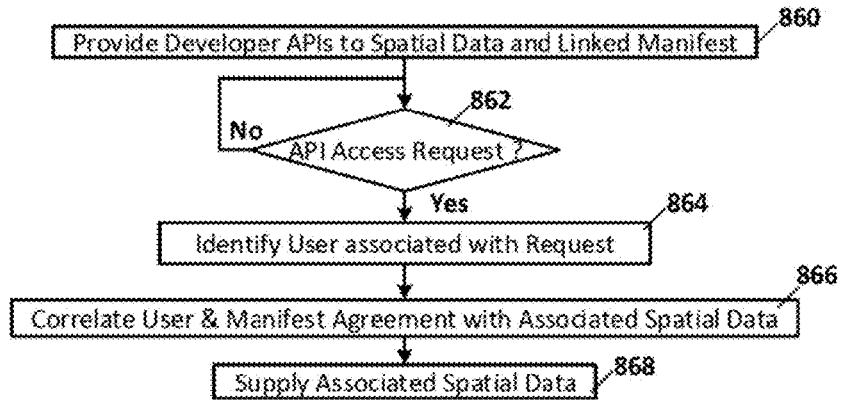
FIG. 8B      WLAN Spatial Diagnostic Utilization

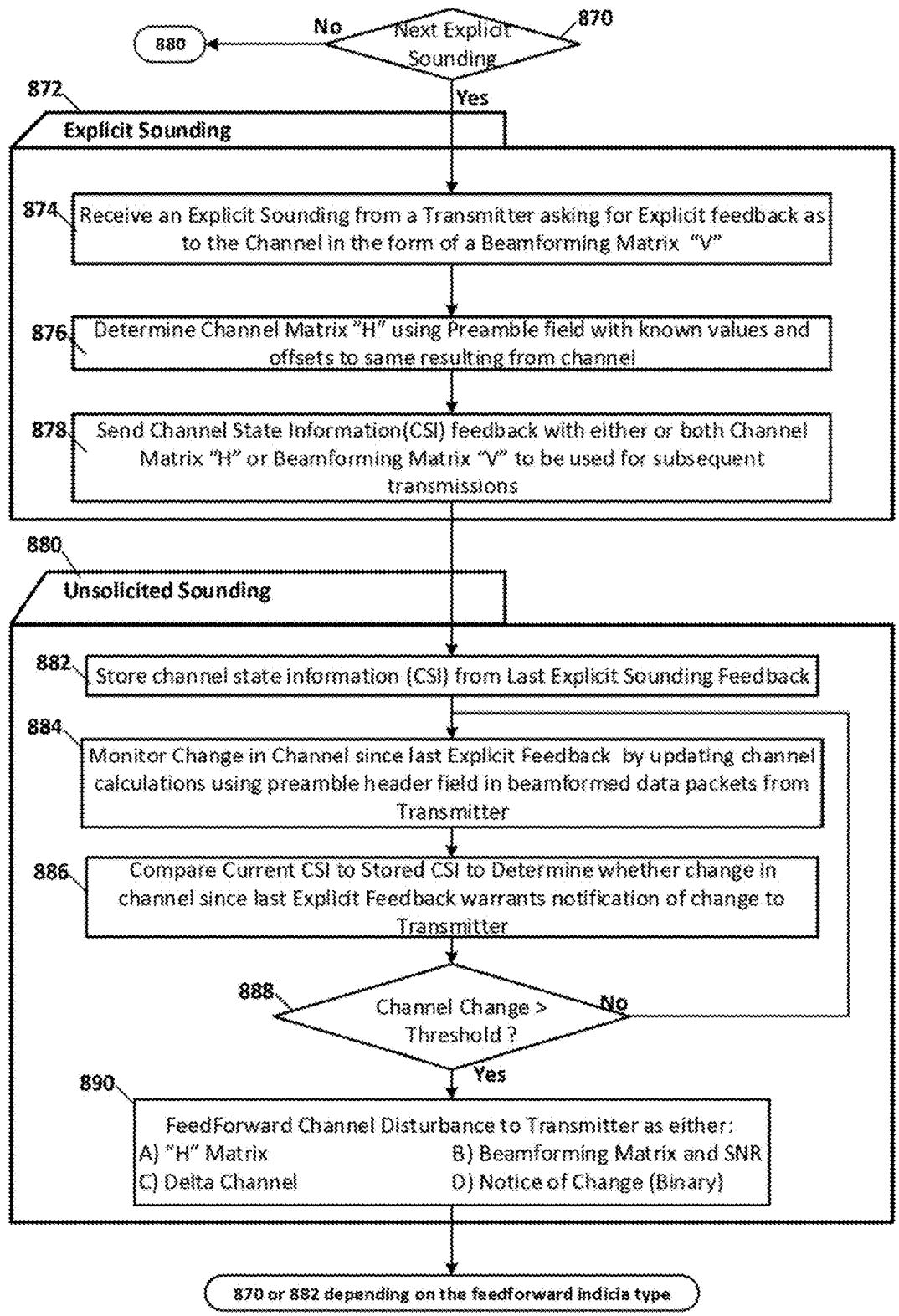
FIG. 8C    Unsolicited Sounding

UNSOLICITED CHANNEL SOUNDING IN A WIRELESS LOCAL AREA NETWORK

BACKGROUND OF THE INVENTION

1. Field of Invention

The field of the present invention relates in general to wireless local area networks (WLAN) including wireless access points (WAP) and wireless stations and methods for spatial diagnosis of same.

2. Description of the Related Art

Home and office networks, a.k.a. wireless local area networks (WLAN) are established and serviced using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

Initially wireless home networks handled Internet communications for a limited number of devices, e.g. 1-3, over an indoor range and throughput of 20 feet and 1 Mbps respectively. As such they were limited to delivery of data, where inconsistencies in delivery, e.g. temporary outages or throughput shortfalls, are not noticeable, e.g. files and web pages. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality. Picture quality is extremely sensitive to placement of the wireless components, i.e. WAP, set top box and/or TV. In addition to higher throughput devices, the next generation WLAN is also expected to handle what is identified as the "Internet of Things" (IoT) e.g. literally hundreds of wireless embedded devices within a home serviced by a single WAP as a communication bridge for coupling the devices associated with the modern home: e.g. computers, TVs, appliances, sensors to the Internet.

What is needed is an improved method of servicing the IoT on a residential/business WLAN.

SUMMARY OF THE INVENTION

The present invention provides a method and apparatus for reducing the overhead associated with frequent explicit channel soundings on a wireless local area network (WLAN) by use of unsolicited sounding feedforward from receiving one of the WLAN nodes in responsive to channel changes that warrant the attention of the transmitting one of the nodes. In an embodiment of the invention a transceiver for a wireless local area network (WLAN), supporting wireless communications between associated transceiver nodes on a selected one of a plurality of communication channels is disclosed. The transceiver includes a sounding feedback module and a sounding feedforward module. The sounding feedback module is responsive to an explicit sounding from a transmitting one of the nodes to send feedback of multiple-input multiple-output (MIMO) channel state information (CSI) derived from the channel sounding to the transmitting one of the nodes for improving subsequent transmissions. The sounding feedforward module is configured to monitor changes in CSI since the last explicit sounding based on CSI determined from the subsequent transmissions of the transmitting one of the nodes and responsive to a determination of a change in CSI above a threshold amount, to feedforward to the transmitting one of the nodes indicia of the change in CSI.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-B are plan views of prior art WLAN intermittent channel soundings and beamformed communications respectively;

FIGS. 2A-2D are a representative Prior Art channel graph, a Prior Art WLAN timing diagram including soundings, a Prior Art detailed explicit sounding timing diagram, and a Prior Art packet diagram of a WLAN packets including the sounding field.

FIGS. 3A-3C are a plan view, a link channel state information (CSI) table, and channel state matrix spatial diagnostics respectively of a WLAN in which channel soundings are correlated with changes in the layout of one or more of the WLAN nodes;

FIGS. 3D-3F are a plan view, a link CSI table, and channel state matrix spatial diagnostics respectively of a WLAN in which channel soundings are correlated with human activity between WLAN nodes;

FIGS. 4A-4F are a plan view, a link CSI table, and a sequence of channel state matrix spatial diagnostics and resultant structural spatial data respectively of a WLAN in which isotropic channel soundings are correlated with structural impediments around WLAN nodes;

FIGS. 4G-4I are a plan view, and channel state matrix spatial diagnostics and resultant structural spatial data respectively of a WLAN in which a channel sounding includes selected sub-channels on which the radiation profile is anisotropic in order to improve the accuracy of the structural spatial data;

FIGS. 5A-5C are sounding data exchange diagrams showing explicit, unsolicited and implicit soundings over a link between two WLAN nodes in accordance with an embodiment of the current invention;

FIGS. 7A-7C are hardware block diagrams of various devices configured to execute the spatial diagnosis of a wireless home network in accordance with an embodiment of the current invention;

FIGS. 8A-8C are process flow diagrams of processes associated with deriving and utilizing spatial diagnostics from WLAN channel soundings and with unsolicited channel soundings in general in accordance with alternate embodiments of the invention.

DETAILED DESCRIPTION OF TH EMBODIMENTS

Figure 6:
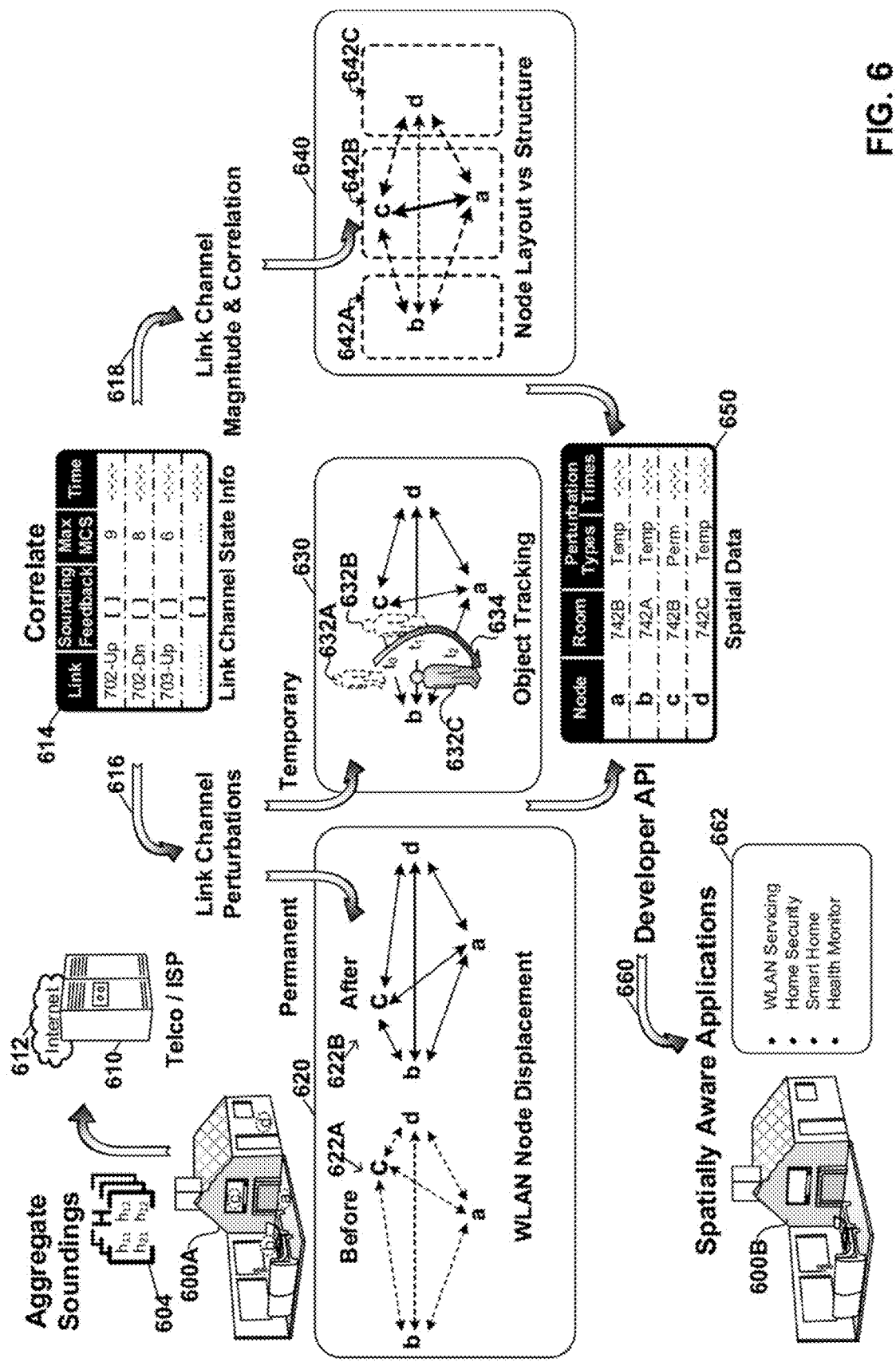
FIG. 6 is a system diagram of various types of spatial data derived from WLAN channel soundings and which in turn can be accessed by a range of applications servicing the needs of residential and business subscribers.

The present invention provides a method and apparatus for spatial diagnosis of a wireless home network for services ranging from: WLAN diagnosis, home security, health care monitoring, smart home utility control, elder care, etc. Instead of the WAP merely serving as a bridge for coupling the stations to the Internet, the WAP and associated stations forming the WLAN take on an additional role as an independent source of content, i.e. spatial data. Examples of this spatial data include: a) Changes in the location of one or more of the WLAN nodes including the identification of the node subject to such displacement and the time of displacement. b) Human activity within the WLAN including the time, location and path of the movement, where the location and path are identified at least relative to the associated WLAN link or link vector. c) Structural impediments occupying the space in and around the WLAN. The provision of this spatial data by the existing WLAN avoids the redundancy and obviates the need for many of the additional wireless devices currently vying for inclusion in the residential and commercial WLAN. In many cases the sensing and monitoring capabilities which these devices proffer, can instead be harvested directly from the existing WLAN nodes during the course of their normal operation. This spatial data obviates the need for dedicated sensors and devices within the home and allows application developers to provide applications servicing the following market segments: WLAN diagnosis, home security, health care monitoring, smart home utility control, elder care, etc. without the need for additional devices or dedicated hardware.

FIGS. 1A-B are plan views of Prior Art WLAN intermittent channel soundings and beamformed communications respectively. The channel soundings shown in FIG. 1A are intermittent probes sent from the WAP identifying one or more station nodes from which sounding feedback is requested. The response to the probe from the recipient station node contains information which allows the WAP to quantify the characteristics of the channel between it and the station node. The transmitter uses this information to improve the efficiency of subsequent communications of data to the intended recipient. The soundings themselves may be sent from a WAP to one or more stations or from a station to the WAP. The soundings whether sent from a device with a single antenna or multiple antenna exhibit an isotropic radiation footprint, i.e. of equal radio frequency (Rf) signal strength in all directions. Soundings exhibit isotropic Rf signal strengths because: a) they are intended to be received by all devices and b) they are designed to allow the recipient device to identify the link channel characteristics. The sounding itself includes a preamble field with known modulation, number of streams, and bit sequence which the recipient device analyzes upon receipt to determine changes thereto brought about the link channel, e.g. fading, attenuation, and phase shift.

In FIG. 1A the WAP 102 is shown setting up communication links 120 and 140 with wireless station nodes 108 and 112 respectively within residence 100. Each link pair exchanges capabilities, e.g. 122A-B on link 120 and capabilities exchange, 142A-B on link 140. During this exchange the number of antenna, the number of streams, the coding and beamforming support capabilities of each device are exchanged. Next an initial explicit sounding request and response takes place, 122C-D on link 120 and 142C-D on link 140. The sounding is sent using an isotropic radio frequency (Rf) signal strength 104. The sounding itself identifies the target station(s) from which a response is requested, and includes a preamble field which is modulated at the maximum number of streams supported by the link partners using a bit sequence and modulation and coding scheme (MCS) known to all recipients. Upon receipt the recipient station(s) determine changes in amplitude and phase to the sounding transmission brought about the link channel, e.g. fading, attenuation, and phase shift and passes indicia of these channel characteristics as sounding feedback response packet(s), 122D, 142D, back to the WAP where they are immediately used to set up beamforming of subsequent data communications as shown in FIG. 1B.

The IEEE 802.11n and 802.11ac standards support increasing degrees of complexity in the signal processing required of fully compliant WLAN nodes including beamforming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon. A baseband component of the WAP or station called a spatial mapper takes as input the independent communication streams for each antenna together with a steering matrix, a.k.a. beamforming matrix, determined during a prior isotropic sounding of the channel as shown in FIG. 1A. The steering matrix contains complex coefficients corresponding to the discrete phase and amplitude adjustments to each antenna's communication streams which provide the required focused signal strength to the composite of the signals transmitted from all antennas. Ideally the superposition of the beamforming matrix coefficients on the corresponding transmitted communication signals from each antenna will result in constructive interference of the communication signals with one another along the path to the target and destructive interference elsewhere. The greater the number of antenna in the phased array the more focused the resultant signal strength.

Now the steering matrix as stated is derived from the prior sounding, and the sounding itself is made using an isotropic radiation profile as shown in FIG. 1A. This isotropic radiation profile can be achieved either by relying on the inherent isotropy of the antennas in a MIMO array and without any steering matrix or by using a steering matrix designed to produce isotropic signal strength in the sounding.

In FIG. 1B the WAP is shown using the sounding feedback to set up subsequent data communications with its link partners, e.g. stations 108, 112. Where the capabilities of the link partners capabilities permit, the sounding feedback is used to establish subsequent beamformed data communications. Beamforming increases the received signal strength and is achieved by independent changes in phase and or amplitude of the signal transmitted from each of the transmit antennas which collectively steer the transmit power footprint toward the intended recipient station(s), using the channel state information (CSI) obtained in the sounding response packets, 122D, 142D (See FIG. 1A). Once each links beamsteering matrix is determined, the sounding feedback is discarded. WAP 102 is shown at time to using its multiple antenna to beamform 105A downlink data communication packets 142E on link 140 to station 112. Subsequently at time $t_1$ WAP 102 is shown beamforming 105B downlink data communication packets 122E on link 120 to station 112. As data communications degrade either or both link partners re-sound the link to update the link CSI, and the prior beamsteering information is discarded.

FIGS. 2A-2D are a representative Prior Art channel graph, a Prior Art WLAN timing diagram including soundings, a Prior Art detailed explicit sounding timing diagram, and a Prior Art packet diagram of a WLAN packets including the sounding field.

FIG. 2A is a representative Prior Art channel graph in which the x and y axis dimension frequency vs. power respectively for the eight 20 MHz communication channels, 200-214. Each communication channel may be selected individually to support a wireless local area network (WLAN). Alternately more than one of the 20 Mhz channels can be aggregated in various combinations to form a 40 Mhz, 80 Mhz or 160 Mhz Aggregate channel to support WLAN communications. Each 20 Mhz communication channel is orthogonal frequency division multiplexed (OFDM), i.e. divided into sub-channels or tones. Each 20 Mhz channel has 56 independently modulated sub-carriers or tones. Communication channel 200 has sub-channels a.k.a. tones, e.g. sub-channels 200A, 200B. This channel layout corresponds to that specified in IEEE 802.11ac for example.

FIG. 2B is a representative Prior Art WLAN timing diagram including soundings. A typical operation of a WLAN includes beacon frames 220A-E sent periodically, e.g. at 100 ms intervals $t_0$-$t_5$. In a representative beacon interval, $t_0$-$t_1$ the following sub-intervals are shown: a contention free interval 224A, a sounding interval 226A and a contention interval 228A. During the contention free interval the WAP sends downlink user data communications sequentially to one or more of the stations in the WLAN. During the sounding interval one or more downstream or upstream links are probed to determine the channel characteristics thereof and using the CSI in the feedback from the sounding the beamforming matrix for each link subject to the sounding is determined. The soundings are conducted on a per link basis, and further may be either a downlink or an uplink sounding. The sounding feedback is different for each link. During the contention based interval carrier sense multiple access (CSMA) is used as a medium access control (MAC) methodology to allow any station to seize control of the channel and send uplink user data communications thereon to the WAP. In the next beacon interval $t_1$-$t_2$ there is a contention free interval 224B and a contention interval 228B. In the next beacon interval $t_2$-$t_3$ there is a contention free interval 224C, one or more soundings 226C, and a contention interval 228C.

FIG. 2C is a Prior Art detailed explicit sounding timing diagram showing a detailed view of a representative sounding 226A as shown in FIG. 2B. An Explicit sounding of the link channels between the WAP and station 108 and the WAP and station 112 are shown. The packets 240, 242, 244, 246, 248 are all associated with the sounding. All packets including those associated with the sounding, include a header portion shown in crosshatch and referenced with the "A" suffix. Following the sounding, communications resume, and user data, e.g. packet 250, is sent on the link(s) that have been sounded. These user data packet(s) are sent using the associated beamforming matrix determined during the preceding sounding.

The explicit sounding provided for in the IEEE 802.11ac standard allows the receiver to assist the transmitter to steer subsequent user data communications toward the receiver using the beamforming matrix provided by the receiver in response to the explicit link channel sounding initiated by the transmitter. An explicit sounding may be initiated by a WAP or a station. In the example shown the WAP 102 initiates the sounding by sending at time $t_0$ sends a null data packet announcement (NDPA) frame 240. The NDPA identifies the WAP and the target recipient station(s) for the sounding. Where more than one station is a target recipient, the order in which the recipient stations are listed controls the order of their response. Next at time $t_1$ a null data packet (NDP) 242 is sent by the WAP. This packet like all the other packets associated with the sounding contains no user data rather the header of the packet 242A contains a ubiquitous preamble field, which in the case of the IEEE 802.11ac standard is identified as the VHT-LTF field 266 shown in FIG. 2D. The VHT-LTF field a.k.a. channel estimation or sounding field, contains a long training sequence used for MIMO channel estimation by the receiver. Each recipient device then determines the corresponding beamsteering matrix required to adjust the phase and amplitude of subsequent MIMO transmissions by the WAP so as to maximize the received signal strength at the receiving station. The first intended target e.g. station 108 then responds at time $t_2$ with the beamforming feedback packet 244 containing CSI. If the receiving station is IEEE 802.11n compliant the feedback is in the form of the link channel matrix H. If the receiving station is IEEE 802.11ac compliant the feedback is in the form of the actual unitary beamsteering matrix V and the per tone diagonal matrix SNR. Any remaining stations targeted by the initial sounding, respond with the beamsteering matrix for their own link when asked to do so by the WAP. The WAP sends a report poll packet 246 at time $t_3$ identifying the next station from which sounding feedback is requested. That station, e.g. station 112, then responds at time $t_4$ with beamforming feedback packet 248. Next, at time $t_5$ the communication of user data packets resumes and user data, e.g. packet 250, is sent on the link(s) that have been sounded using the associated beamforming matrix determined during the preceding sounding.

FIG. 2D a Prior Art packet diagram of a WLAN packets including the sounding field. All WLAN packets whether associated with communicating a sounding or with the communication of user data include a ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the NDPA payload instructions which identify the receiving stations which are requested to share their channel analysis with the transmitter so as to improve its subsequent communications. FIG. 2D shows such a packet 242 and the corresponding symbol interval (SI) required to transmit each field thereof. The header 242A includes a legacy portion containing the L-STF, L-LTF and L-SIG fields and a very high throughput portion containing the VHT-SIGA, VHT-STF, VHT-LTF and VHT-SIGB fields. The payload portion 242B contains no user data. The legacy (L), long (LTF) and short (STF) training and signal (SIG) 260 fields are compatible with stations supporting only the IEEE 802.11n or earlier standards. The remaining signal and training fields are intended only for very high throughput, e.g. IEEE 802.11ac compliant devices. The VHT-SIGA field 262 contains information on the modulation and coding scheme (MCS) and number of streams of the sounding. The VHT-STF field 264 is used for automatic gain control (AGC). The VHT-LTF field 266, a.k.a. channel estimation or sounding field, contains a long training sequence used for MIMO channel estimation by the receiver.

All WLAN packets whether associated with communicating a sounding or the communication of user data include a similar header portion with the same training and signal preamble fields with known sequences which allow the receiving station to synchronize reception with packet boundaries and to determine the received channel.

FIGS. 3A-3C are a plan view, a link channel state information (CSI) table, and channel state matrix spatial diagnostics respectively of a WLAN operating in accordance with an embodiment of the invention in which channel soundings are correlated with changes in the layout of one or more of the WLAN nodes. WLAN soundings and subsequent data communications are conducted in the same manner as in the prior art case but rather than discarding sounding feedback after beamsteering matrices are determined, as is the case with Prior Art soundings, the CSI from each sounding is in this embodiment of the invention stored and time stamped for subsequent spatial analysis. The spatial analysis can be conducted on the WAP or in the "Cloud" on a dedicated computer server for example. In either case the spatial analysis of the historical CSI takes place without disrupting or altering normal WLAN activity, e.g. soundings and data communications.

FIG. 3A is a plan view of a home 100 in which WAP 302 is shown setting up communication links 320 and 340 with wireless station nodes 308 and 312 respectively. Each link pair exchanges capabilities, e.g. 322A-B on link 320 and 342A-B on link 340. Next an explicit sounding request and response takes place, 322C-D on link 320 and 342C-D on link 340. The sounding is sent using an isotropic radio frequency (Rf) signal strength 304. Upon receipt the recipient station(s) determine indicia of these channel characteristics and pass these CSI as sounding feedback response packet(s), 322D, 342D, back to the WAP where they are immediately used to establish subsequent MIMO beamforming of user data communications. Unlike prior art sounding feedback which is discarded after beamsteering matrices for subsequent data communications are determined, the sounding feedback a.k.a. CSI, is stored in memory element 306 as link channel state information 307A from which the spatial data 307B will be calculated. These spatial data calculations whether performed on the WAP 302 or in the 'cloud', take place in parallel with and therefore without disrupting normal WLAN communications.

Once you are storing CSI rather than discarding it, what can you do with it? One answer surprisingly enough is that you can determine when performance changed in the WLAN or on a specific link thereof, and offer a possible explanation for same. For example, if the WLAN performed properly at one point in time, and then after movement of a WAP or station node, ceased to perform properly then knowledge of which node rotated or was moved coupled perhaps with WLAN performance metrics before and after the move(s) can be used to isolate a potential source of the WLAN's problems and allow the technician or homeowner to focus on a targeted solution to the problem. Thus spatial data can be exploited by: Telco or ISP call centers or technical support or onsite service technicians, to improve diagnosis of WLAN problems.

FIG. 3B shows the Link CSI table 307A in which the history of each link's CSI information for the uplink and downlink is stored over time, with the timestamp as to when each record was obtained, and the maximum modulation and coding schema (MCS) and or throughput supported by the link at that point in time.

FIG. 3C shows how such CSI information can be analyzed to extract spatial data, pertaining in this embodiment of the invention to WLAN node placement or displacement. A time sequence of matrices obtained from explicit sounding feedback at times to, $t_1$, $t_2$, $t_3$ are shown. Matrices 324A-D are obtained from successive soundings of link 320. Matrices 344A-D are obtained from successive soundings of link 340. These along with associated link MCS or throughput metrics are extracted from the link CSI table 307A. The matrices have row and column counts corresponding to the number of transmit and receive antennas on the corresponding link partners, i.e. WAP 302 and station node 308 on downlink 320 and WAP 302 and station node 312 on downlink 340. The coefficients of each matrix are listed in dB or the power ratio in decibels of measured power. Each matrix corresponds to the product of the conjugate transpose, a.k.a. Hermitian, of the channel matrix and itself. This matrix product, may be derived from the explicit sounding feedback of the beamsteering matrix "V" and the per tone signal-to-noise ratio (SNR) matrix as specified in the IEEE 802.11ac standard as shown in FIG. 6A. In alternate embodiments of the invention sounding CSI may consist of the channel matrix "H" as specified in the IEEE 802.11n standard from which the $H^+H$ can also be determined.

In the example shown the spatial diagnostics proceed as follows. Over the time interval of the sounding samples shown, i.e. $t_0$-$t_4$ the CSI for link 320 is stable, with substantially similar matrix coefficients: $c_{11}$, at −50 dB, $c_{12}$ at −55 dB, $c_2$, at −57 dB, $c_{22}$ at −52 dB. This suggests spatial stability of both the WAP 302 and its link partner station node 308 over the interval covered by the aggregated soundings. Spatial stability in this embodiment of the invention means neither movement of either link partner/node from one location to another, nor in place rotation of the device and its associated antenna, either or both of which would result in a permanent perturbation of the matrix coefficient values. Over the same time interval, however, the CSI for link 340 is not stable. The matrix coefficients at to and $t_1$ are permanently perturbed in subsequent interval $t_2$ and $t_3$. This suggests movement or rotation on the part of either link partner, i.e. WAP 302 or station node 312. However since the other link in which WAP 302 is a partner experienced no perturbation in the same interval, it is reasonable to conclude that the node movement 340C in the interval between sounding feedback $t_1$ and $t_2$ took place on the part of station node 312. One such example of movement is positional movement 340C of station 312 from position 340A to 340B as shown in FIG. 3A. These correlations of CSI over time with device positioning can be stored as spatial data 307B and used for services including: customer, call center, or service technician diagnosis of changes in network performance or similar such troubleshooting.

FIGS. 3D-3F are a plan view, a link channel state information (CSI) table, and channel state matrix spatial diagnostics respectively of a WLAN operating in accordance with an embodiment of the invention in which channel soundings are correlated with human activity between WLAN nodes. WLAN soundings and subsequent data communications are conducted in the same manner as in the prior art case, with the exception of the treatment of sounding feedback of CSI. Prior Art sounding feedback of CSI is used to determine beamforming matrices and then discarded. In accordance with the current invention however, CSI is not discarded, rather stored and time stamped for subsequent spatial analysis. The spatial analysis can be conducted on the WAP or in the "Cloud" on a dedicated computer server for example. In either case the spatial analysis of the historical CSI takes place without disrupting or altering normal WLAN activity, e.g. soundings and data communications.

FIG. 3D is a plan view of the home 100 in which WAP 302 is shown setting up communication links 320 and 340 with wireless station nodes 308 and 312 respectively. Each link pair exchanges capabilities, e.g. 322A-B on link 320 and 342A-B on link 340. Next an explicit sounding request and response takes place, 322C-D on link 320 and 342C-D on link 340. The sounding is sent using an isotropic radio frequency (Rf) signal strength 304. Upon receipt the recipient station(s) determine indicia of these channel characteristics, a.k.a. CSI, and pass these as sounding feedback response packet(s), 322D, 342D, back to the WAP where they are immediately used to set up subsequent data communications. Unlike prior art sounding feedback which is discarded after beamsteering matrices for subsequent data communications are determined, the sounding feedback a.k.a. CSI, in this embodiment of the invention is stored in memory element 306 as link channel state information 307A from which the spatial data 307B will be calculated. These spatial data calculations whether performed on the WAP 302 or in the 'cloud', take place in parallel with and therefore without disrupting normal WLAN communications.

Once you are storing CSI over time you can also determine which links or set of links were disrupted due to human activity. For example, suppose the soundings of a WLAN link are conducted at 100 ms intervals. If those soundings are temporarily disrupted over a timescale which correlates with human activity, e.g. a human walking at a pace of 4-5 feet per second within a home on a path which intercepted a WLAN link might be expected to disrupt 8-12 successive soundings of the link. Furthermore, if other links are sequentially disrupted then knowledge of which links were disrupted by human activity and when, may be used to estimate a path of human activity within the home relative to the links. This spatial data as to human activity can be exploited by the Telco or Wireless Service Provider to provide a range of services to the home including: turning appliances or lights on and off as a person enters and exits a room, determining for home security purposes whether anyone is in the home and if they are then sounding an alarm or notifying the police, and determining for elder care monitoring what the activity pattern and times thereof are for an elderly individual.

FIG. 3E shows the Link CSI table 307A in which the history of each link's CSI information for the uplink and downlink is stored over time, with the timestamp as to when each record was obtained.

FIG. 3F shows how such CSI information can be analyzed to extract spatial data, pertaining in this embodiment of the invention to human activity between WLAN nodes. A time sequence of matrices 324A-D, 344A-D obtained from explicit sounding feedback at times to, $t_1$, $t_2$, $t_3$ for links 320 and 340 respectively are shown. These are extracted from the link CSI table 307A. The matrices have row and column counts corresponding to the number of transmit and receive antennas on the corresponding link partners. The coefficients of each matrix are listed in dB. Each matrix corresponds to the product of Hermitian of the channel matrix and itself. This matrix product, may be derived from the explicit sounding feedback of the beamsteering matrix "V" and the per tone signal-to-noise ratio (SNR) matrix as specified in the IEEE 802.11ac standard as shown in FIG. 6A. In alternate embodiments of the invention sounding CSI may consist of the channel matrix "H" as specified in the IEEE 802.11n standard from which the H+H can also be determined.

In the example shown the spatial diagnostics proceed as follows. Over the time interval of the sounding samples shown, i.e. $t_0$-$t_4$ the CSI for link 340 is stable with substantially similar matrix coefficients: $c_{11}$ at −40 dB, $c_{12}$ at −45 dB, $c_{21}$ at −35 dB, $c_{22}$ at −40 dB. This suggests no human activity between WAP 302 and its link partner station node 312 over the interval covered by the aggregated soundings. Over the same time interval, however, the CSI for link 320 is not stable. The matrix coefficients are temporarily perturbed at time $t_2$. Perturbation between matrices in a sequence can in an embodiment of the invention be determined from the sum of the squares of the differences in the coefficients of the two matrices as follows:

Link Channel Perturbation:

$$\Delta BC(B_{11}-C_{11})^2+(B_2-C_{12})^2+(B_{21}-C_{21})^2+(B_{22}-C_{22})^2 \qquad \text{Equation 1}$$

where B and C are the channel matrices being compared, e.g. matrices 324B, 324C. If the sum ABC exceeds a threshold amount, associated with normal variations in a channel, then a perturbation is deemed to have taken place. The perturbation in this example is temporary since the link perturbation ΔAD, e.g. a comparison of matrices 324A, 324D, in a surrounding interval, is zero indicating that no permanent perturbation has taken place over the interval $t_0$-$t_4$, only the temporary perturbation at time $t_2$ as evidenced in the link perturbation magnitude ΔBC. These correlations of CSI over time with human activity between links can be stored as spatial data 307B and used for services including: smart home, home security, and home health care for example.

IEEE 802.11 Sounding Feedback CSI Types:

The IEEE 802.11 standards specify wireless local area networks. The more recent versions of this standard describe a function identified as channel sounding in which the receiving member of a link pair passes channel information to the transmitting one of the pair, to improve subsequent transmissions. Sounding feedback resulting from channel soundings contains CSI as specified by the corresponding wireless standard. Traditionally, the CSI is used to derive a beamsteering matrix which in turn is used to control subsequent beamformed communications from one of the link partners, e.g. the WAP to the other link partner, e.g. station(s). The advantage of a beamsteering matrix results from the fact that both transmitting and receiving link partners have more than one antenna which are used to engage in multiple-input multiple-output (MIMO) communications. By controlling the phase and amplitude of transmissions on each antenna, the overall radiative profile of the transmissions takes on increased strength along the link path and is reduced elsewhere. This improves communications to the receiver without an increase in overall power required on the transmitter. The receiver uses its intimate knowledge of the received characteristics of the sounding transmission from the transmitter to determine a beamsteering matrix which the transmitter can use to improve subsequent MIMO transmissions to the receiver.

IEEE 802.11n

The IEEE 802.11n standard specifies sounding feedback in the form of the channel matrix "H" with row and column dimensions corresponding to the number of transmit and receive antenna respectively. There is one H matrix for each of the OFDM sub-channels or tones within the selected channel. Traditionally, the sounding feedback was only used for immediate calculation of a beamsteering matrix "V" after which it was discarded and replaced with the beamsteering matrix determined from the next sounding.

In accordance with this invention, however, the IEEE 802.11n sounding feedback, i.e. channel matrices H, are also aggregated and subject to additional analysis to determine: channel perturbation, channel attenuation/magnitude, channel scattering/correlation, and time of flight as will be discussed below. One or more of these parameters can in turn be correlated with one another to produce spatial data including: Structural Spatial Data, Human Activity within the WLAN, or changes in the location of a WLAN Device.

IEEE 802.11ac

The IEEE 802.11ac standard specifies sounding feedback in the form of both a beamsteering matrix "V" and a signal-to-noise ratio "SNR" matrix. In other words, in this standard the receiver calculates the beamsteering matrix itself and then sends it back to its link partner for controlling subsequent MIMO transmissions thereof. The H matrix itself is not part of the feedback. Each V and SNR matrix has row and column dimensions corresponding to the number of transmit and receive antenna respectively. There is a V and an SNR matrix for each of the OFDM sub-channels or tones within the selected channel.

The V and SNR matrices are determined by the receiver from a singular value decomposition (SVD) of the channel matrix H, as follows:

Singular Value Decomposition of Link Channel:

$$[H]=[U][\Sigma][V]^+ \quad \text{Equation A}_1$$

where U and V are unitary matrices and Σ is a diagonal real-valued matrix. By their very definition these per-tone SNR values are simply scaled versions of the diagonal elements of Σ. Therefore sounding feedback comprises two of the three matrices resulting from the SVD of the receive channel matrix.

Traditionally, the sounding feedback was only used for driving subsequent MIMO communications over the multiple antennas of the transmitting one of the link partners using the beamsteering matrix "V" delivered as part of the sounding feedback. Further, after each sounding, the beamsteering matrix was discarded in a typical prior art WLAN.

In accordance with this invention, however, the IEEE 802.11ac sounding feedback V and SNR matrices are also aggregated and subject to additional analysis to determine: channel perturbation, channel attenuation/power loss, channel scattering, and time of flight as will be discussed below. One or more of these parameters can in turn be correlated with spatial data including: Structural Spatial Data, Human Activity, or Device Location changes.

In an embodiment of the invention that analysis is preceded by the following derivation:

Transpose of Link Channel Matrix:

$$[H]^+[H]=[V][\Sigma]^+[\Sigma][V]^+ \quad \text{Equation A}_2$$

where V is the unitary matrix provided in the sounding feedback, and Σ is the scaled version of the per tone SNR matrix also provided with the sounding feedback.

The H⁺H matrix can be used to determine: channel perturbation, channel attenuation/power loss and channel scattering/correlation. One or more of these parameters can in turn be correlated with one another to produce spatial data including: Structural Spatial Data, Human Activity within the WLAN, or changes in the location of a WLAN Device.

Spatial Parameter Determinations

Once the sounding feedback is obtained a number of spatial parameters can be determined therefrom.

Power Loss of a Link Channel

Given a link channel matrix H that represents the MIMO link channel between two link partners, the total loss in power between the signal transmitted from one of the link partners and received by the other link partner expressed in terms of the received channel matrix H, is given by:

$$\text{Power Loss} = -10\text{Log}_{10}(\text{Trace}(H^+H)) = \quad \text{Equation 2}$$
$$-10\text{Log}_{10}\sum_{i=1}^{N}(H^+H)_a$$

where the coefficients of H are expressed linearly rather then logarithmically and where N is the number of diagonal elements in the matrix. This loss of power in dB may result from either or both the spatial distance between the link partners or the presence of one or more structural impediments, e.g. a wall there between. A typical residential wall might be expected to attenuate a link channel between stationary link partners by 10 dB.

In free space, such as a line of site link between a WAP and a station in the same room, link power attenuates as a function of distance roughly as follows:

Freespace Power Attenuation:

$$\text{Power Loss} = -50 - 20\text{ Log}_{10}(D) \quad \text{Equation 3}$$

where D is the separation in meters of the WLAN nodes, e.g. WAP and station, which form a link. Thus a 10 dB attenuation corresponds to an uncertainty in link separation distance of 7-10 meters for relevant residential structures, depending on whether there is or is not an intervening wall. One way of resolving that uncertainty as to whether the power loss is due to a wall or other structural impediment or due simply to the distance separating the link partners, is to determine how much scattering and reflection is exhibited by the link channel.

Scattering Exhibited by a Link Channel

The link channel matrix H contains all sorts of information as to the differences between the MIMO paths between the multiple antennas of the transmitter to the multiple antennas of the receiver. Geometrically, for a transmitter with two antennas and a receiver with two antennas there are 4 discrete paths between the transmitter and receiver. The link channel matrix characterizes all of these. The scattering of the channel, e.g. whether it is predominantly line of site (LOS) without structural impediments or multi-path (MP) with many structural impediments is expressed in terms of the correlation of the channel. This in turn is given by the standard deviation sigma of the diagonal elements of the link channel as follows:

Correlation of a Link Channel:

$$\sigma = \text{Standard Deviation of Trace}(H^+H) = \sqrt{\frac{\sum_{i=1}^{N}((H^+H)_a - \overline{(H^+H)_d})^2}{N-1}}$$

Equation 4a where the coefficients of H are expressed linearly rather than in log scale, and where $\overline{(H^+H)_{ii}}$ is the mean of the trace values. This standard deviation can be normalized for more meaningful comparison of the degree of scattering between link channels independent of magnitude as follows:

Normalized Correlation of a link Channel:

$$\hat{\sigma} = \sigma/\overline{(H^+H)_{ii}}$$

Equation 4b

The normalized standard deviation can be used to distinguish between channel power loss due to a structural impediment with ensuing scattering and reflection, versus channel loss due to signal attenuation due exclusively to the distance separating link partners without intervening structural impediments. Higher standard deviations are associated with link channels which are low in scattering, i.e. are primarily line of site and without intervening structural impediments. Lower standard deviations are associated with link channels with significant scattering and which therefore may include one or more intervening structural impediments. Another way of resolving uncertainty as to whether the power loss is due to a wall or other structural impediment or due simply to the distance separating the link partners, is to determine time of flight for a link, which directly correlates with the distance separating the link nodes, and is largely independent of the degree of scattering.

Time of Flight of a Link Channel

Where the sounding feedback includes the link channel matrix H the time of flight of the link channel can be determined by comparing the phase rotation between neighboring sub-channels or tones. Phase rotation over time of flight is frequency dependent. Therefore a sounding on two neighboring tones or sub-channels initially transmitted with no phase shift there between will upon receipt exhibit a relative phase shift between the two tones that increases with the time of flight of the link. Since each sub-channel has a well defined center frequency and where sounding feedback, i.e. an H matrix, is provided for each tone, it is possible to determine the time of flight of the link from the relative phase shift in the sounding of the two neighboring tones. Such sounding feedback is currently available with IEEE 802.11n compliant devices. The first step in determining time of flight for a link is to express the complex coefficients of each of the neighboring tone's associated H matrix as a product of a real valued matrix and a complex scalar as follows:

Time of Flight of a Link Channel:

$$[H] = \begin{bmatrix} c_{11} & c_{12} \\ c_{21} & c_{22} \end{bmatrix} = e^{-j2\pi\varphi} \begin{bmatrix} r_{11} & r_{12} \\ r_{21} & r_{22} \end{bmatrix}$$

Equation 5a where "c" is a complex coefficient expressing phase and amplitude of a received signal, where "r" is a real number, and where phi $\phi$ is the average phase rotation across all complex coefficients of a link channel H for a given tone or sub-channel. Once we have determined the average phase rotations $\phi_1$ and $\phi_2$ for the neighboring tones we proceed with the next step in the determination.

Consider two tones with center frequencies $f_1$ and $f_2$ in a signal "s":

Signal on Neighboring Sub-Channels:

$$s(t) = A_1 e^{j2\pi f_1 t} + A_2 e^{j2\pi f_2 t}$$

Equation 5b where $A_n$ is the message, and "$f_n$" is the center frequency, and $2\pi f_n t$ is the period of oscillation of the signal. A channel may have as many as 512 tones but we need only look at the neighboring pair or pairs that we are using for the phase delay calculation. The neighboring tones used for the comparison may be adjacent to one another or removed from one another.

When this signal travels a time $\Delta T$, it arrives at the receiver as:

Arriving Signal on Neighboring Sub-Channels:

$$s(\Delta T) = A_1 e^{j2\pi f_1 \Delta T} + A_2 e^{j2\pi f_2 \Delta T}$$

Equation 5c where the phase phi on each of the pair of selected tones are $\phi_1 = 2\pi f_1 \Delta T$ and $\phi_2 = 2\pi f_2 \Delta T$.

The time of flight along the link can be determined from these phases.

Time of Flight:

$$\Delta T = \frac{\varphi_2 - \varphi_1}{2\pi(f_2 - f_1)}$$

Equation 5d

Once the time of flight along the link is determined, the separation of the nodes that form the link can also be determined.

Link node separation:

$$D = \Delta T(c)$$

Equation 5e where D is the separation in meters of the WLAN nodes, e.g. WAP and station, which form a link and c is the speed of an electromagnetic signal in air or approximately c=3×10 m/s. We know that signal speed is independent of its frequency. So every nanosecond of flight time $\Delta T$ corresponds to roughly 1 foot or approximately 0.3048 meters of distance between the WLAN nodes which form the link.

FIGS. 4A-4F are a plan view, a link CSI table, and a sequence of channel state matrix spatial diagnostics and resultant structural spatial data respectively of a WLAN in which isotropic channel soundings are correlated with structural impediments around WLAN nodes.

FIG. 4A is a plan view of a residential WLAN 100 with a WAP node 402 and station nodes 408-412. Spatial information about the structure and the relative placement of the WLAN nodes is determined from the aggregated sounding feedback. Sounding feedback is aggregated in a link CSI table in memory element 406 which is coupled to WAP 402. Two soundings are shown. The 1$^{st}$ set of soundings are downlink soundings from the WAP 402 to stations 408, 410, 412 on corresponding links 420, 430, 440. The sounding and responses 422C-D. 432C-D, 442C-D for links 420, 430, 440 respectively are shown. The $2^{nd}$ set of soundings from station 412 include: one uplink sounding to WAP 402 and two crosslink soundings to stations 408 and 410. The uplink sounding on link 450 to WAP 402 includes the sounding and response packets 452C-D. A crosslink sounding on link 460 to station 408 includes the sounding and response packets 462C-D. The other crosslink sounding on link 470 to station 410 includes the sounding and response packets 472C-D. The crosslink soundings shown in this embodiment of the invention do not interfere with normal network operation, occurring as they do concurrently with the normal uplink sounding on link 440. These crosslink soundings do however allow for a richer set of spatial parameters by adding to the pool of aggregated CSI, spatial information from links that are not used for user data communications and thus in the prior art case, not subject to soundings.

In a WLAN all links follow a rimless hub and spoke paradigm with the WAP at the hub and with communications limited to the link with each station forming a spoke. In the prior art there are no user data communications nor soundings on crosslinks between stations. In this embodiment of the, invention even though there are no user data communications on the crosslinks between stations, soundings of those crosslinks are still aggregated in order to improve the quality of the spatial information which can be derived during normal WLAN operations.

The $1^{st}$ and $2^{nd}$ soundings from WAP 402 and station 412 respectively are sent using an isotropic radio frequency (Rf) signal strength 404 and 414 respectively. Unlike prior art sounding feedback which is discarded after beamsteering matrices for subsequent data communications are determined, the sounding feedback a.k.a. CSI, is stored in memory element 406 as link channel state information 407A from which the spatial data 407B will be calculated. These spatial data calculations whether performed on the WAP 402 or in the 'cloud', take place in parallel with and therefore without disrupting normal WLAN communications.

Once you are storing CSI over time you can also determine the probable structure within which the WLAN operates. For example, suppose two nodes, e.g. a WAP node and a station node, of the WLAN are in the same room of the residence. The sounding feedback is more likely to indicate a higher received power, and less scattering and reflection of the link signal than would be the case if the nodes were in different rooms of the residence. Furthermore if other WAP links exhibit relatively lower received power and more scattering and reflection of the link signal the associated stations are more likely to be in a different room of the residence than the WAP. The aggregate of these spatial parameters may be used to estimate the structural relationship between the WLAN nodes and the rooms of the surrounding structure. This spatial data as to the WLAN and the residence of which it is a part can be exploited by the Telco or Wireless Service Provider to provide either directly or through application developers, a range of services to the home including: turning appliances or lights on and off as a person enters and exits a room, turning a WLAN node on and off as a person enters and exits a room, determining for home security purposes whether anyone is in the home and if they are then sounding an alarm or notifying the police of the intrusion and the room in which the intrusion is taking place, and determining for elder care monitoring what the activity pattern and times thereof are for an elderly individual on a room by room basis.

FIG. 4B is a link CSI table 407A in which the history of each link's CSI information for the uplink, downlink and crosslinks are stored over time, with the timestamp as to when each record was obtained, and the maximum modulation and coding schema (MCS) and or throughput supported by the link at that point in time.

FIGS. 4C-D and FIGS. 4E-4F are a sequence of channel state matrix spatial diagnostics and resultant structural spatial data for the WLAN in residence 100 after the $1^{st}$ and $2^{nd}$ isotropic soundings of the WAP 402 and station 412 respectively.

FIG. 4C shows the CSI information obtained in the $1^{st}$ set of isotropic soundings, i.e. the downlink soundings from the WAP to the stations. The matrices 422E, 432E, 442E resulting from the CSI obtained in these soundings are shown. Each matrix corresponds to the product $H^+H$ of the transpose of the link channel matrix and itself. The matrices for the three downlinks 420, 430, 440 sounded in the $1^{st}$ isotropic sounding are shown. These along with associated link MCS or throughput metrics are extracted from the link CSI table 407A. The matrices have row and column counts corresponding to the number of transmit and receive antennas on the corresponding link partners. This matrix product, may be derived from the explicit sounding feedback specified in either the IEEE 802.11n or 802.11ac standards.

FIG. 4D shows how such CSI information can be analyzed to extract spatial data, pertaining in this embodiment of the invention to WLAN structural impediments or surrounding structure. In the example shown the spatial diagnostics proceed as follows using in this example, for the sake of simplicity a diagnosis of the power loss and correlation exhibited by the link channel to determine surrounding and or intervening structure. The power loss exhibited by the link channel is determined from the trace of each $H^+H$ matrix as discussed above in connection with Equation 2. The amount of correlation exhibited by the various MIMO paths, i.e. the amount of scattering, within a link channel is determined from the standard deviation of the trace of each $H^+H$ matrix as discussed above in connection with Equations 4a-b. Each downlink is shown along with its associated power loss in decibels (dB) and normalized correlation, a.k.a. standard deviation coefficient. The three downlinks labeled a-b, a-c and a-d correspond to links 420, 430, 440 respectively as shown in FIG. 4A. Downlink 420, referenced as a-b, exhibits a power loss of −78 dB and a normalized standard deviation of 0.32 both derived from matrix 422E. Downlink 430, referenced as a-c, exhibits a power loss of −56 dB and a normalized standard deviation of 1.41 both derived from matrix 432E. Downlink 440, referenced as a-d, exhibits a power loss of −72 dB and a normalized standard deviation of 0.16 both derived from matrix 442E.

On the basis of the $1^{st}$ set of soundings spatial parameters the WLAN nodes associated with link a-c, i.e. WAP 402 and station 410 are tentatively identified as residing in a single room 490A of the structure 100. The link between these WLAN nodes exhibits the least power loss, i.e. the highest signal strength and the least scattering, i.e. the highest standard deviation of all the links. By contrast, the relatively larger power loss and higher degree of scattering associated with the remaining links suggests that the associated link targets nodes 408, a.k.a. "b", and 412, a.k.a. "d" are not in the same room with the WAP 402 or the station 410. Thus at the end of the $1^{st}$ set of soundings stations 408 and 412 are identified as residing in room 490B, separate from the WAP 402 and station 410 which are in the other room 490A. After the $1^{st}$ set of isotopic soundings considerable ambiguity or uncertainty exists as to the surrounding structures of each WLAN node. We do not know for example whether station nodes 408, a.k.a. "b", and 412, a.k.a. "d" are in the same room with each other. This ambiguity at least is resolved after the second set of soundings taken by station 412.

FIG. 4E shows the CSI information obtained in the $2^{nd}$ set of isotropic soundings, i.e. the uplink and crosslink soundings from station 412. The matrices 452E, 462E, 472E resulting from the CSI obtained in these soundings are shown. The matrices for the one uplink 450 and two crosslink 460, 470 isotropic soundings are shown. These along with associated link MCS or throughput metrics are extracted from the link CSI table 407A. The matrices have row and column counts corresponding to the number of transmit and receive antennas on the corresponding link partners. This matrix product, may be derived from the explicit sounding feedback specified in either the IEEE 802.11n or 802.11ac standards.

FIG. 4F shows how such additional CSI information can be analyzed to refine the spatial data as to WLAN structural impediments or surrounding structure obtained in the 1 a set of soundings. Each uplink and crosslink is shown along with its associated power loss in decibels (dB) and normalized correlation, a.k.a. standard deviation coefficient. The uplink and pair of crosslinks labeled d-a, d-b and d-c correspond to links 450, 460, 470 respectively as shown in FIG. 4A. Uplink 450, referenced as d-a, exhibits a power loss of −73 dB and a normalized standard deviation of 0.16 both derived from matrix 452E. Crosslink 460, referenced as d-b, exhibits a power loss of −89 dB and a normalized standard deviation of 0.16 both derived from matrix 462E. Crosslink 470, referenced as d-c, exhibits a power loss of −75 dB and a normalized standard deviation of 0.16 both derived from matrix 472E.

On the basis of the $2^{nd}$ set of sounding's spatial parameters the WLAN nodes associated with link d-b, i.e. station 412 and station 408 are identified as residing in separate rooms 490C and 490E of the structure 100. The link between these WLAN nodes exhibits the greatest power loss, i.e. the least signal strength (89 dB) and among the highest levels of scattering, i.e. the lowest standard deviation (0.16) of all the links. Furthermore, neither of these stations resides in the same room 490D as either station 410 or WAP 402 as determined after the $1^{st}$ soundings. Additionally, the relatively lower power loss over link d-a (−73 dB) as opposed to link d-c (−75 dB) indicates that WAP 402 is on the side of room 490D closer to station 412 while station 410 is likely on the other more distant side of the room. Thus after the $1^{st}$ and $2^{nd}$ sets of isotopic soundings spatial impediments and surroundings of the WLAN nodes have largely been resolved. The remaining spatial ambiguities, if any, may concern the layout of the devices in each room in two or three dimensional space. The embodiment of the invention shown in the following FIGS. 4G-I allows for these ambiguities to be resolved, without interrupting normal WLAN communications or protocols.

The soundings up to this point have referred to as isotropic in that ideally the sounding signal strength from each WLAN node, i.e. station or WAP, including those equipped with more than one antenna, and including those that support multiple-input multiple-output (MIMO) is uniform in all directions. That sounding characterization includes each sub-channel or tone which makes up the communication channel on which the sounding is taking place. Thus the soundings that have been discussed to this point can also be further characterized as homogenous in that the channel sounding signal strength is isotropic as is the signal strength of each individual sub-channel or tone thereof.

FIGS. 4G-4I are a plan view, and channel state matrix spatial diagnostics and resultant structural spatial data respectively of a WLAN in which a channel sounding includes selected sub-channels on which the radiation profile is anisotropic in order to improve the accuracy of the structural spatial data.

FIG. 4G introduces an embodiment of the invention which includes a heterogeneous sounding. The heterogeneous sounding of the channel includes a mix of tones with isotropic and anisotropic signal strengths. In the embodiment shown in FIG. 4G most of the tones or sub-channels are isotropically sounded, i.e. sounded with signal strengths that are ideally uniform in all directions. Remaining selected ones of the OFDM tones or sub-channels are sounded using beamforming matrices to drive the antenna array so as to impart anisotropic signal strengths exhibiting distinct directionality to the sounding on each of the selected tones. For example, of the 56 tones comprising a typical IEEE 802.11ac 20 MHz channel, four of the tones or sub-channels, e.g. tones with indices 0, 14, 28, and 42, are in this embodiment of the invention sounded using beamsteering matrices which impart distinct azimuthal directionality to the Rf signal strength of each, e.g. 0°, 90°, 180°, 270° respectively. The set of tones selected for anisotropic sounding will typically be evenly disbursed throughout the remaining 56 tones which will continue to be sounded with isotropic signal strengths. The anisotropic tones will improve the accuracy of the correlation between the CSI from the channel soundings and the spatial characteristics of the WLAN such as the structural impediments among the WLAN nodes. The efficacy of subsequent beamformed communications will not be negatively impacted even on the tones which were anisotropically sounded, because the beamsteering matrices for said tones will be interpolated from the beamsteering matrices for the neighboring isometrically sounded tones. The derivation of beamsteering matrices for said tones will have sufficient accuracy given the limited change in sub-channel characteristics between adjacent tones.

The distinct signal strength directionality that is imparted by the MIMO antenna array to each of the tones selected for anisotropic sounding is determined using standardized calculations of weights and phase for phased array of antenna on the subject WLAN node, e.g. WAP or station as follows.

Directionality of Phased Array:

The sounding sent on each antenna will include antenna specific adjustments, e.g. a complex weighting factor, to the phase and amplitude of each sounding so that the composite sounding signal on the given tone or sub-channel will exhibit constructive interference between soundings from each antenna in the desired direction and destructive interference in all others.

Take the case of a linear array of antennas spaced apart at ½ the wavelength of the center frequency of the channel. The array factor (AF) is a function dependent only on the geometry of the array and the beamsteering, i.e. amplitude and phase, applied to its individual elements. The following function is the array factor AF for a linear array of antennas each spaced apart from one another along a line coincident with the x axis at ½ the wavelength of the center frequency of the channel:

Array Factor for Linear Array:

$$AF = \sum_{n=0}^{N-1} e^{jn\pi(\cos\theta_d - \cos\theta)} \quad \text{Equation 6a}$$

where n is the index of each antenna and $\theta_d$ is the azimuthal angle to which the array is to be steered and $\theta$ is the azimuthal angle at which the signal strength is to be determined. The weight $w_n$ to be applied to each element of the linear array to steer the array in the desired direction is:

Weights for each Antenna of Linear Array:

$$w_n = e^{jn\pi(\cos\theta_d)} \quad \text{Equation 6b}$$

FIG. 4G is a plan view of the heterogeneous sounding on a residential WLAN 100 with the WAP node 402 and the station nodes 408-412. The WAP node includes an array of antenna, e.g. 2 antenna 403A, 403B separated by a distance 403C of approximately ½ of the wavelength of the center frequency of the channel. The heterogeneous soundings in accordance with this embodiment of the invention may be carried out on IEEE 802.11 compliant WLAN nodes which have 2 or more antennas and which support beamforming. Spatial information about the structure and the relative placement of the WLAN nodes is determined from the aggregated sounding feedback. Sounding feedback is aggregated in the link CSI table 407A in memory element 406 which is coupled to the WAP 402. Spatial data 407B will be calculated from this aggregated sounding feedback. These spatial data calculations whether performed on the WAP 402 or in the 'cloud', take place in parallel with and therefore without disrupting normal WLAN communications.

A single heterogeneous downlink sounding is shown. The individual tones or sub-channels 405 which make up the OFDM channel are shown. For a 20 Mhz channel 56 tones or sub-channels make up the OFDM channel. Selected tones or sub-channels having indices: 0, 14, 28, and 42 are subject to discrete anisotropic soundings. The associated anisotropic Rf signal footprints and azimuthal angles are shown: 404B at 0° for tone 0, 404C at 90° for tone 14, 404D at 180° for tone 28. The remaining footprint for tone 42 at 270° is not shown. The remaining tones or sub-channels each have an isotropic sounding Rf signal footprint 404A.

The downlink sounding is used to characterize all links 420, 430, 440 from WAP 402 to stations 408, 410, 412 respectively. The sounding and responses 422C-D, 432C-D, 442C-D for links 420, 430, 440 respectively are shown. The anisotropic sounding shown in this embodiment of the invention on selected ones of the tones or sub-channels does not interfere with normal network operation, occurring as they do concurrently with the normal isometric sounding of the remaining tones on the channel. These anisotropic soundings on selected sub-channels or tones do however provide a richer set of spatial parameters by adding to the pool of aggregated CSI, spatial information derived from the discrete directionality of the sounding signal strength from each of the selected tones. The anisotropically sounded sub-channels may be used singly or in combination with the remaining isotropically sounded sub-channels for the determination of spatial information.

FIG. 4H shows the CSI information obtained in the single heterogeneous downlink sounding from the WAP to the stations. The matrices for the selected anisotropic ones of the tones 405 on each of the links are shown. The H$^+$H Matrices 422E$_0$, 422E$_{14}$, 422E$_{28}$, 422E$_{42}$, measured directly or indirectly by the receiving station 408 for link 420 for the tones having indices 0, 14, 28, and 42 are shown. The H$^+$H Matrices 432E$_0$, 432E$_{14}$, 432E$_{28}$, 432E$_{42}$, measured by the receiving station 410 for link 430 for the tones having indices 0, 14, 28, and 42 are shown. The H+H Matrices 442E$_0$, 442E$_{14}$, 442E$_{28}$, 442E$_{42}$, measured by the receiving station 412 for link 440 for the tones having indices 0, 14, 28, and 42 are shown. Each matrix corresponds to the product H$^+$H of the transpose of the link channel matrix and itself as determined by the receiving station. These matrices along with associated link MCS or throughput metrics are extracted from the link CSI table 407A. The matrices have row and column counts corresponding to the number of transmit and receive antennas on the corresponding link partners. This matrix product, may be derived directly or indirectly from the explicit sounding feedback specified in either the IEEE 802.11n or 802.11ac standards.

FIG. 4I shows how such CSI information can be analyzed to extract spatial data, pertaining in this embodiment of the invention to WLAN structural impediments or surrounding structure. In the example shown the spatial diagnostics proceed as follows using in this example, for the sake of simplicity a diagnosis of the power loss and correlation exhibited by the link channel to determine surrounding and or intervening structure. The power loss exhibited by the link channel is determined from the trace of each H$^+$H matrix as discussed above in connection with Equation 2. The amount of correlation exhibited by the various MIMO paths, i.e. the amount of scattering, within a link channel is determined from the standard deviation of the trace of each H$^+$H matrix as discussed above in connection with Equations 4a-b. Each downlink is shown along with its associated power loss in decibels (dB). For the sake of simplicity the power loss is shown only for three of the four sub-channels which are discretely anisotropically sounded. In order they are the power loss in dB for tones having indices: 28, 14 and 0 sounded at azimuthal angles of 180°, 90°, and 0° respectively relative to the WAP.

Link 420 between WAP 402 (*a*) and station 408 (*b*) is shown as exhibiting a power loss of −69 dB on the sub-channel with index 28 sounded anisotropically at an azimuthal angle of 1800. Link 420 also exhibits a power loss of −78 dB on the sub-channel with index 14 sounded anisotropically at an azimuthal angle of 90°. Link 420 also exhibits a power loss of −87 dB on the sub-channel with index 0 sounded anisotropically at an azimuthal angle of 0°. Based only on relative power loss and the associated direction of the associated anisotropic sounding, vector addition is used to determine the likely spatial orientation of the WLAN station 408 (*b*) as having an azimuthal angle of 160° relative to the WAP 402. The magnitude of the attenuation in power at 180° suggests an intervening wall indicating that station 408 is in a different room 490A from the WAP in room 490B.

Link 430 between WAP 402 (*a*) and station 410 (*c*) is shown as exhibiting a power losses of −74 dB, −53 dB and −76 dB on the sub-channels with indices 28, 14, 0, sounded anisotropically at azimuthal angles of 180°, 90°, 0° respectively. Vector addition is used to determine the likely spatial orientation of the WLAN station 410 (*c*) as having an azimuthal angle of 110° relative to the WAP 402. The modest attenuation in power at 90° suggests an absence of obstacles or structure along this link indicating that station 410 is in the same room 490B as the WAP.

Link 440 between WAP 402 (*a*) and station 412 (*d*) is shown as exhibiting a power losses of −87 dB, −82 dB and −64 dB on the sub-channels with indices 28, 14, 0, sounded anisotropically at azimuthal angles of 180°, 90°, 0° respectively. Vector addition is used to determine the likely spatial orientation of the WLAN station 412 (*d*) as having an azimuthal angle of 35° relative to the WAP 402. The sizeable attenuation in power at 0° suggests an intervening wall along this link indicating that station 412 is in a different room 490C from the WAP.

In other embodiments of the invention additional spatial information may be derived from the CSI sounding feedback such as the relative amounts of scattering or correlation exhibited by each link channel in response to each of the discrete anisotropic soundings. In another embodiment of the invention both the CSI derived from sounding the isotropic together with the anisotropically sounded sub-channels may be used for the structural determinations. In another embodiment of the invention the CSI sounding feedback indicative of the angle of receipt, i.e. the V matrix, may be used to further refine the spatial determination.

FIGS. 5A-5C are sounding data exchange diagrams showing explicit, unsolicited and implicit soundings respectively over a link between two WLAN nodes 500, 502 in accordance with an embodiment of the current invention. Both WLAN nodes 500, 502 have multiple antenna and support beamforming.

FIG. 5A shows an Explicit sounding sequence. The explicit sounding is initiated at time to with sounding transmissions by WLAN node 500 which may be a WAP or a station node. The sounding is conducted on a selected one of the communication channels available to the WLAN. The first of these sounding transmissions is a null data packet announcement (NDPA) (not shown) which announces the target node(s) for the sounding. This announcement packet is followed by a null data packet (NDP) 510. Both the NDPA and the NDP packets are sent using an isotropic Rf signal strength 508. Neither the NDPA nor the NDP contains any user data such as video or audio for example. These packets are explicitly dedicated to soliciting a sounding of the link channel. The header 510A of the NDP contains a Very High Throughput Long Training Field, a.k.a. VHT-LTF, which the receiver 502 uses to characterize the link channel H. The receiving node 502 which may be a WAP or a station determines the link channel $H_n$, where "n" is the sub-channel index, for each of the OFDM tones or sub-channels of the selected channel. The channels for the first three tones $H_0$, $H_1$, $H_2$ referenced as 512A-C are shown. The receiving node will then at time $t_1$, send the associated channel state information (CSI) back to node 500 in a sounding feedback packet 520. If the sounding feedback conforms to the IEEE 802.11n standard, it will include the H matrix for each sub-channel or tone. If the sounding feedback conforms to the IEEE 802.11ac standard, it will include the V and SNR matrix for each sub-channel or tone. The receiver 502 determines these matrices by performing a singular value decomposition (SVD) on the H matrix for each sub-channel or tone as shown in Equation A1. The SNR matrix as discussed above is derived by scaling the SVD's sigma $\Sigma$ matrix. Upon receipt of the sounding feedback packet 520 the WLAN node 500 processes the feedback and determines (IEEE 802.11n) or reads (IEEE 802.11ac) the V matrix therefrom. WLAN node 500 determines the $V_n$ matrix, where "n" is the sub-channel index, for each of the OFDM tones or sub-channels of the selected channel. The V matrix for the first three tones $V_0$, $V_1$, $V_2$ referenced as 522A-C are shown. These V matrices, a.k.a. the beamsteering matrices, starting at time $t_2$, are used for beamsteering the Rf signal strength 528 of the subsequent user data packets 530 and packet headers 530A transmitted toward the recipient WLAN node 502. The CSI from the explicit sounding feedback is also aggregated in the WAP or in the "Cloud" for subsequent spatial analysis.

FIG. 5B shows an Unsolicited sounding sequence according to an embodiment of the invention. The primary distinction of which is that unsolicited soundings are not initiated by the transmitter. Rather sounding feedback is unsolicited and occurs at the instigation of the receiving station during normal beamformed user data communications when changes in the received channel warrant feed forward of the changes to by the receiving WLAN node to the transmitting WLAN node. The sounding itself is made possible by the fact that all packets transmitted over the WLAN include the VHT-LTF field. As discussed above, the VHT-LTF, a.k.a. sounding field, contains known or pre-defined: modulation, number of streams, and bit sequence which the recipient device analyzes upon receipt to determine changes thereto brought about the link channel, e.g. fading, attenuation, and phase shift. The receiver is constantly using this field to determine for each sub-channel the associated H channel matrix to use for demodulating the received user data during normal communications.

At time $t_0$ the transmitting node 500 is shown engaging in normal beamformed 538 MIMO transmit communications of a user data packet 540 and associated header 540A to the receiving node 502. The communications are conducted on the selected one of the communication channels available to the WLAN. The header 540A of each user data packet contains a Very High Throughput Long Training Field, a.k.a. VHT-LTF, which the receiver 502 uses to characterize the link channel H. The receiving node 502 which may be a WAP or a station determines the link channel $H_n$, where "n" is the sub-channel index, for each of the OFDM tones or sub-channels of the selected channel. The channels for the first three tones $H_0$, $H_1$, $H_2$ referenced as 542A-C are shown. If the receiving station determines based on a comparison with prior link channel analysis that the link channel H has changed 548 significantly then the WLAN node 502 will feed forward the CSI information in packet 550 at time $t_1$ to the transmitting node 500. In an embodiment of the invention the sounding feed forward may also be sent directly to the aggregating entity for the spatial data, e.g. the WAP or the server or other computer processing entity associated with the "Cloud". If the sounding feed forward conforms to the IEEE 802.11n standard, it will include the H matrix for each sub-channel or tone. If the sounding feedback conforms to the IEEE 802.11ac standard, it will include the V and SNR matrix for each sub-channel or tone. Upon receipt of the sounding feedforward packet 550 the WLAN node 500 processes the feedforward and determines (IEEE 802.11n) or reads (IEEE 802.11ac) the V matrix therefrom. WLAN node 500 determines the $V_n$ matrix, where "n" is the sub-channel index, for each of the OFDM tones or sub-channels of the selected channel. The V matrix for the first three tones $V_0$, $V_1$, $V_2$ referenced as 552A-C are shown. These V matrices, a.k.a. the beamsteering matrices, starting at time $t_2$, are used for adjusting the beamsteering of the Rf signal strength 558 of the subsequent user data packets 560 and packet headers 560A transmitted toward the recipient WLAN node 502. The CSI from the unsolicited sounding feedback is also aggregated in the WAP or in the "Cloud" for subsequent spatial analysis.

FIG. 5C shows an Implicit sounding sequence. At time to normal beamformed 568 communication of user data packets 570 are taking place. As per the IEEE 802.11 standard receipt of each received user data packet is acknowledged with the transmission of an "ACK" packet 580 from WLAN node 502 to WLAN node 500. At time $t_1$ WLAN node 500 performs a reverse channel sounding using the VHT-LTF field in the header 580A of the ACK packet. WLAN node 500 uses this CSI to characterize the forward link channel H from WLAN node 500 to WLAN node 502. WLAN node 500 determines the corresponding beamsteering matrices 582A-C by performing an SVD thereon for each tone or sub-channel. These V matrices 582A-C, a.k.a. the beamsteering matrices, starting at time $t_2$, are used for beamsteering the Rf signal strength 588 of the subsequent user data packets 590 and packet headers 590A transmitted toward the recipient WLAN node 502. The CSI from the implicit sounding is also aggregated in the WAP or in the "Cloud" for subsequent spatial analysis. In another embodiment of the invention the CSI sounding feedback indicative of the power in the received signal, e.g. the received signal strength indicator (RSSI), may be used to further refine the spatial determination.

FIG. 6 is a system diagram of various types of spatial data derived from WLAN channel soundings and which in turn can be accessed by a range of applications servicing the needs of residential and business subscribers. A residence 600A is shown with a WLAN including wireless nodes a-d, typically a WAP and stations. As the WLAN nodes conduct their channel soundings associated with MIMO beamforming for user data communication, they aggregate the CSI information from the soundings over time rather than discarding it. Aggregation of the CSI, e.g. the link channel matrices H 604 may take place in the WAP, or in the cloud. In this embodiment of the invention aggregation takes place at the Telco or Internet Service Provider (ISP) 610, coupled to the Internet 612. The CSI from the soundings of the links is stored in a link CSI table 614 in a memory element or storage element on the Telco or ISP server for processing by an associated processor thereon. The CIS table may also include a timestamp for each link channel indicating its time of collection and the associated MCS or throughput supported on the associated link at that time as well as the direction of throughput.

In an embodiment of the invention the link channels are analyzed for perturbations 616 in the channel coefficients. The links associated with the permanent perturbations are individually analyzed 620 both before 622A and after 622B the permanent perturbation to identify any WLAN node subject to displacement as discussed above in connection with FIGS. 3A-C. Node displacement may take the form of a change in physical location of the node or its reorientation either of which will result in significant permanent changes in the associated link channel matrices. If a WLAN node was displaced, the time of its displacement along with the change in throughput before and after the displacement is stored in spatial data table 650. In the example shown, wireless node 'c' e.g. a station node, is displaced further away from node "d" and closer to node "b".

The links associated with the temporary perturbations in the link channels are individually analyzed 630 to determine whether the perturbations are consistent with human activity in the residence, and if so the path of the activity. Perturbations at times $t_0$, $t_1$, $t_2$ to links b-c, b-d, b-a respectively are correlated with human activity 632A-C in the residence and a path 634 of that activity through the WLAN links is determined as discussed above in connection with FIGS. 3D-F. The time and path of this human activity and or the temporary perturbations of the associated links are stored as records in spatial data table 650.

In another embodiment of the invention the link channels magnitudes, correlation and scattering, time of flight are analyzed 618. These parameters are correlated 640 with node layout and structural impediments within or around the WLAN nodes as discussed above in connection with FIGS. 4A-I. In the example shown nodes "a" and "c" are determined to be in the same room 642B of the residence in between the rooms 642A and 642C associated with nodes "b" and "d" respectively. This layout and structural information is stored in the spatial data table 650 on the Telco or ISP's server or cloud database.

In an embodiment of the invention the spatial data is made available to $3^{rd}$ party developers via application programming interfaces (API)s 660. This allows the developers to create homeowner facing applications 662 for: WLAN servicing, home security, smart home, and health monitoring within each homeowner's residence 600B. The spatial data can be useful in diagnosing issues with WLAN operation since one of the causes of such issues may be movement of a device node from a location at which performance was acceptable, to a new location at which service interruptions are experienced. The spatial data can be useful in home security scenarios such as determining the presence of an intruder in the home. The spatial data can be used in smart home scenarios such as turning devices or utilities on or off depending on the presence or absence of a human in a room of the residence. The spatial data can also be useful for health monitoring of an elderly person in a home to track their activity, or determine whether they have had a fall. Each of these potential consumer facing applications use as their foundation the spatial data aggregated from the homeowner's own residence from their WLAN without interrupting or degrading the normal WLAN communication function.

FIGS. 7A-7C are hardware block diagrams of various devices configured to execute the spatial diagnosis of a wireless home network in accordance with various embodiments of the current invention.

FIG. 7A shows a processor 700 and memory element or storage module 712 configured to execute spatial analysis program code 716 associated with a WLAN spatial analyzer module 702. The program code may be configured to run on a single device or cooperatively on one or more host devices. The spatial analyzer module includes: a sounding generator 704A and integral sounding feedback and feedforward modules 704B-C respectively, a sounding aggregator 706, a spatial correlator 708, a developer API 709, and an access control 710. In addition to program code, the storage module includes: link CSI records 714, spatial data 715, and WLAN and subscriber identification records 718.

In operation the sounding generator 704A controls a request associated with an explicit sounding and the feedback module 704B controls the response to an explicit sounding. The feedforward module 704C controls the notification of changes in the channel associated with unsolicited soundings. For explicit soundings the sounding generator 704A controls the timing and generation of the sounding as well as the stations targeted for a sounding feedback response. In embodiments of the invention where the isotropic sounding includes selected tones or sub-channels with anisotropic RF signal footprints the selection of the anisotropically sounded tones and the determination of their distinct directionality is controlled by the sounding generator 704A. The sounding feedback module 704B is responsive to an explicit sounding from a transmitting one of the nodes to send feedback of multiple-input multiple-output (MIMO) channel state information (CSI) derived from the channel sounding to the transmitting one of the nodes for improving subsequent transmissions. For unsolicited soundings the sounding feedforward module 704C controls the determination of when the channel change warrants feed forward of link channel CSI as well as the actual sending of that feed forward sounding CSI. In an embodiment of the invention the sounding feedforward module 704C is configured to monitor changes in CSI since the last explicit sounding based on CSI determined from the subsequent transmissions of the transmitting one of the nodes and responsive to a determination of a change in CSI above a threshold amount, to feedforward to the transmitting one of the nodes indicia of the change in CSI.

The sounding aggregator 706 controls the aggregation of uplink, downlink, and crosslink CSI sounding feed forward and feedback and the storage of the associated CSI records in storage 712 as link channel CSI records 714.

The spatial correlator 708 correlates CSI from the explicit or unsolicited channel soundings with spatial characteristics of the WLAN including at least one of: a change in location of a WLAN node, human activity among the WLAN nodes, and structural impediments among WLAN nodes. The spatial correlator stores the resultant spatial data 715 in storage 712. The spatial correlator in an embodiment of the invention correlates perturbations over time in the CSI of WLAN link(s) with at least one of: a change in location of an associated WLAN node and human activity across the WLAN link(s). In another embodiment of the invention the spatial correlator correlates at least one of: magnitudes, time of flight, and multi-path properties of the CSI of the WLAN link(s) with the structural impediments to communications on said link(s). In an embodiment of the invention the spatial correlator determines perturbations in the CSI by evaluating changes over time in the link channel matrix coefficients in accordance with Equation 1. In an embodiment of the invention the spatial correlator determines power loss in a link channel as the magnitude of the trace of the matrix resulting from the multiplication of the link channel Hermitian and itself, i.e. $H^+H$, in accordance with Equation 2. In an embodiment of the invention the spatial correlator determines the amount of scattering exhibited by a link channel as the standard deviation of the trace of the matrix resulting from the multiplication of the link channel Hermitian and itself, i.e. $H^+H$, in accordance with either Equation 4a or 4b. In an embodiment of the invention the spatial correlator determines the time of flight of a link channel by determining both the difference in the average phase rotation of two neighboring OFDM sub-channels or tones of the link channel together with the difference in the center frequency of the two sub-channels in accordance with Equations 5a-e.

The developer API module 709 provides the APIs for accessing the spatial data including a manifest template which includes the files, features and permissions required by the associated application. The Application access control module 710 governs an applications access to spatial data. This includes correlation of the manifest file permissions, the identify of the application user, and the WLAN owned by the application user with the corresponding spatial data. The application access control module uses the subscriber and WLAN identifier table 718 to make these determinations.

FIG. 7B shows a wireless access point (WAP) 720 configured as a host device within a residence 100 servicing a WLAN 766 which includes wireless station 768. The WAP supports discrete communications with a station 768 or concurrent multiple user multiple-input multiple-output (MU-MIMO) communications with multiple stations. The WAP 720 in this embodiment of the invention is identified as a 2×2 WAP supporting as many as 2 discrete communication streams "a", "b" over two antennas 764. The WAP 720 includes: the processor 700 and storage 712; a bus 724, a WLAN stage 730 including a base band stage 732, a radio frequency (Rf) stage 762 and antennas 764. The WAP RF stage supports one or more IEEE 802.11 wireless local area network (WLAN) protocols. The WAP also includes a modem 722 for coupling via copper or fiber to an Internet Service Provider (ISP) 780. The processor in addition to supporting the IEEE 802.11 WAP functionality also executes the program code which provides spatial diagnostic functionality as discussed in connection with FIG. 7A.

In the baseband stage 732 transmitted communications for user/station 768 are encoded and scrambled in encoder scrambler module 750 and de-multiplexed into two streams in demultiplexer 752. Each stream "a", "b" is subject to interleaving and constellation mapping in an associated interleaver mapper 754 and passed to the spatial mapper 756. The spatial mapper uses a beamsteering matrix 755 determined from a prior isotropic sounding of the link with station 768 to steer subsequent communications thereto. The beamsteering matrix specifies specific phase and amplitude adjustments for the communications on each antenna designed to steering the outgoing communications toward the recipient station. There is a discrete beamsteering matrix for each of the OFDM tones or sub-channels. The combined streams "ab" are injected into each of the OFDM tones or sub-channels 758A-B of the inverse discrete Fourier Transform (IDFT) modules 760A-B respectively. Each IDFT module is coupled via associated upconversion circuitry in the Rf stage 762 to an associated one of the pair of antenna 764. During Explicit soundings there is no beamsteering, rather the Rf radiation signal strength is the same in all directions.

In the Rf Stage 762 received communications "ab" on each of the two antenna 764 from user/station 768 are downconverted and supplied as input to the baseband stage 732. In the baseband stage the received communications are then transformed from the time to the frequency domain in the discrete Fourier Transform (DFT) modules 734A-B from which they are output as discrete orthogonal frequency division multiplexed (OFDM) tones/sub-carriers/sub-channels 736A-B. All received streams are then subject to equalization in equalizer 738. Received steams "ab" are subject to de-interleaving and constellation demapping in associated deinterleaver demapper modules 740, followed by multiplexing in multiplexer 742. The received data "ab" is decoded and descrambled in decoder descrambler 744.

FIG. 7C shows a Telco or ISP 780 having a server 782 configured as a host device and coupled to the Internet 784. The server includes the processor 700 and storage 712; a bus 786, an input/output (I/O) module 788 for interfacing with a user, a network module 790 for coupling to a network, a main memory 792 for storing and executing program code 716 and data, a read only memory 794 for storing bootup program code. The processor in addition to supporting the server functionality also executes the program code which provides spatial diagnostic functionality as discussed in connection with FIG. 7A. In an embodiment of the invention the WAP 720 performs initial aggregation of sounding CSI information from all WLAN nodes and the server performs the final aggregation and analysis of the CSI information for each of the WLANs with which the Telco or ISP is associated. In another embodiment of the invention all stations as well as the WAP send the sounding CSI to which they have access directly to the server 782 for aggregation and spatial diagnostics.

FIGS. 8A-8B are process flow diagrams of processes associated with deriving and utilizing spatial diagnostics from WLAN channel soundings in accordance with an embodiment of the invention. In decision process 800 a determination is made as to whether the next downlink, uplink, or crosslink sounding(s) have taken place on the WLAN. If they have then control passes to process 802.

In process 802 the link channel CSI resulting from the explicit or unsolicited MIMO soundings of any or all WLAN links are aggregated after any normal use associated with the 'normal' operation of the WLAN. No aggregation takes place in prior art soundings. Rather, in the 'normal' use of channel sounding feedback from explicit soundings in Prior Art WLAN operations, the soundings feedback is used exclusively by the transmitting node to update the beamsteering matrix for subsequent communications on the associated link and is then discarded. By contrast all soundings in this embodiment of the invention are also subsequently centrally aggregated on the WAP or in the "Cloud" server for subsequent spatial analysis. In an embodiment of the invention aggregation begins at a station with the collection of link channel CSI from uplink or crosslink soundings with subsequent delivery of the link channel CSI to the WAP or directly to the "cloud" e.g. a Telco or ISP server. In another embodiment of the invention aggregation begins at the WAP with the collection of link channel CSI from downlink and uplink soundings. In either embodiment of the invention aggregation may be performed exclusively at the WAP or cooperatively between the WAP and the "Cloud" on a server coupled to the WAP through a wired or wireless broadband connection to the ISP or Telco servicing the WLAN associated with the WAP. Next control is passed to processes 802.

In the block of processes 804 spatial correlation of the aggregated link channel takes place. The first of the processes in this block is decision process 806. In decision process 806 a determination is made as to the type of sounding analysis required. If the sounding analysis is historical control is passed to process 808. In process 808 the historical trends in link channel CSI from the aggregated downlink, uplink and crosslink soundings are evaluated. The evaluation includes whether a perturbation of the associated link channel has taken place and if so when and of what type, e.g. temporary or permanent. Perturbations are determined by evaluating changes over time in the link channel matrix coefficients from the associated soundings.

Next in decision process 810 a determination is made as to whether the perturbations being evaluated are temporary or permanent. Processing of permanent perturbations begins in process 812 in which permanent link channel perturbations are correlated with changes in location or orientation of a WLAN device or node as discussed above in connection with FIGS. 3A-C. Next in process 814 any changes in throughput of the associated link are noted before and after the change in location or orientation of the WLAN node. Next in process 816 the corresponding spatial data as to the relocated or reoriented WLAN node(s) is stored as spatial WLAN node data for the associated WLAN.

Alternately, if in the perturbation decision process 810 a determination is made that the perturbations being evaluated are temporary then control is passed to process 820. In process 820 the processing of temporary perturbations of a link channel are correlated with human activity within or across the associated links as discussed above in connection with FIGS. 3D-F. Next in process 822 the perturbation times of different links is used to determine a prospective path of human activity relative to the WLAN links. Next in process 824 the corresponding spatial data as to the human activity within the residence serviced by the WLAN nodes is stored as spatial activity data for the associated WLAN.

Alternately, if in the sounding analysis decision process 806 a determination is made that steady state sounding analysis is to be performed then control passes to process 830. The steps associated with steady state sounding analysis may be performed concurrently with or subsequent to the historical sounding analysis, with each improving the accuracy of the other. Steady state analysis commences with process 830 in which the link channel CSI associated with each links sounding is evaluated for magnitude of the link channels power or signal strength, the time of flight associated with the link and the scattering or multipath properties of the link channel. In an embodiment of the invention the power loss in a link channel is determined from the magnitude of the trace of the product of the link Channel Hermitian and itself, i.e. $H^+H$. In an embodiment of the invention the time of flight of the at least one link is determined as proportional to the quotient of the phase rotational difference divided by the frequency difference of two neighboring OFDM sub-channels of the selected communication channel. The neighboring tones may be adjacent to one another or separated from one another by one or more intervening tones or sub-channels. In an embodiment of the invention the scattering of a link channel is determined from the standard deviation of the trace of the product of the link Channel Hermitian and itself. $H^+H$. After these evaluations have been completed control is passed to process 832.

In process 832 a further evaluation is performed when and if the generally isotropic soundings associated with the link channel CSI included a selected subset of OFDM tones or sub channels which were anisotropically sounded. If so, then the discrete directionally associated with the sounding of each tone within these sub-channels is evaluated and used to improve the accuracy of the correlation in the following step 834.

In process 834 the above described sounding parameters evaluated in processes 830-832 are correlated with prospective note layout and structural impediments including structural surroundings. At one extreme minimums of link channel: power loss, scattering, and time of flight, are correlated with link nodes in the same room or structure with one another. Conversely, at another extreme maximums of link channel: power loss, scattering, and time of flight are correlated with link nodes in different rooms from one another and separated by one or more walls depending on the amount of power loss and scattering. Additionally where a link channel exhibits power loss without scattering a correlation is made as to the distance separating the link nodes. Conversely, where a link channel exhibits power loss with significant scattering a correlation is made as to structural impediments between the link nodes. Where selected tones of the associated sounding were directionally sounded the direction of the sounding is correlated with the relative layout of the nodes on this and other links subject to the sounding. This improves the accuracy of the node layout and structural impediment correlations. Next in process 836 the corresponding spatial data as to WLAN node layout and structural impediments including surrounding structures is stored as spatial structural data for the associated WLAN.

After all forms of spatial correlation have been completed the associated spatial data is stored in process 840 with identifiers for the associated property or structure, e.g. a street address, and for the associated owner or subscriber of the WLAN, e.g. the subscribers name and account number. This spatial data can then be made available to application developers for numerous residential and business spatial Applications such as: WLAN diagnosis, home security, health care monitoring, smart home utility control, elder care, etc.

FIG. 8B is a process flow diagrams of processes associated with an embodiment of the invention for utilizing spatial diagnostics from WLAN channel soundings as shown in FIG. 8A. Processing begins in process 860 with the provisioning of a standardized set of application programming interfaces (API) for application developers to use in applications requiring programmatic access to the stored spatial data. In addition to the APIs each Application is required to have a manifest file listing the functions of the application, the files required for the application, and the access privileges required by the Application. These access privileges are displayed to the user of the Application, e.g. the homeowner, before enabling the application. So for example, if the homeowner wants to give access only to spatial WLAN node data and not to Spatial Human Activity Data then the homeowner can make this choice before installation and or activation of the associated Application. Next control is passed to decision process 862 in which a determination is made as to whether a given application is making a request for the stored spatial data. If so, then control is passed to process 864 in which the identify of the user of the application associated with the request is determined. Next in process 866 the identify of the user and the manifest access privileges of the requesting application are correlated with the associated spatial data for the user's WLAN. Control is then passed to process 868 in which the relevant spatial data is provided in response to the API request.

FIG. 8C is a process flow diagram of processes associated with unsolicited channel soundings in general in accordance with an alternate embodiment of the invention. Processing begins with decision process 870 in which a determination is made as to whether an explicit sounding request has been received from a transmitting one of the WLAN nodes, i.e. either one of the station nodes, or the WAP node. If an explicit sounding request has been received then control is passed to the block 872 of processes associated with responding to the explicit sounding request. In process 874 the explicit sounding request asking for explicit feedback as to the channel between the transmitting and receiving one of the nodes is received. In the explicit sounding defined in IEEE 802.11n standard for example, the receiver is expected to determine the channel matrix "H" and send that back to the transmitter for the use in improving subsequent transmissions. In the explicit sounding defined in IEEE 802.11ac standard for example, the receiver is expected to determine the channel matrix "H" and from that the MIMO beamforming matrix "V" and to send that back to the transmitter for the use in improving subsequent transmissions. After receipt of the explicit sounding request the receiver in process 876 determines the channel matrix "H" using the preamble field in the header of the sounding request, e.g. the VHT-LTF field. The preamble field contains known values and any offsets in phase or amplitude to same are used by the receiver to characterize the channel between the transmitter and the receiver. Next in process 878 the receiver will send the channel state information (CSI) as feedback to the transmitter. The feedback includes either the channel matrix "H" or the beamforming matrix "V" depending on which of the IEEE 802.11 standards is applied. The transmitter uses this feedback to improve subsequent transmissions. In the complex multi-path channel environment encountered by MIMO transmissions the feedback of the "H" or "V" matrices consumes a lot of airtime due to amount of data that has to be transmitted to characterize the multipath channel and the low modulation and coding schema (MCS) at which this feedback may be transmitted. Each explicit sounding consumes precious airtime. Control is then passed to the block of processes 880 associated with unsolicited soundings.

The unsolicited soundings and block of processes 880 associated therewith offer a means for reducing sounding overhead by the receiver proactively notifying the transmitter when a new explicit sounding is needed. This allows the transmitter to reduce the sounding frequency and develop a reliance on the receiver to proactively notify it, the transmitter, when a new explicit sounding is required. Processing begins in process 882 in which the CSI from the feedback response to the last explicit sounding is stored on the receiver for use in determining when and if there is a change in the channel between it and the transmitter. Control then passes to process 884 in which the receiver uses the preamble field in each subsequent communication from the transmitter to monitor the channel. The receiver monitors changes in the channel since the last explicit sounding feedback by updating channel calculations using the preamble field, e.g. the VHT-LTF field in beamformed data packets from the transmitter. Control then passes to process 886. In process 886 the receiver compares current CSI to stored CSAI to determine whether changes in the channel since the last explicit sounding feedback warrant notification of change to the transmitter. Control is then passed to decision process 888. In decision process 888 a determination is made as to whether the change in the channel is above a threshold amount. The magnitude of the threshold is such as to avoid notifications to the transmitter of insignificant changes or minor fluctuations in the channel that do not substantially degrade communications. If channel variations are below the threshold amount then control returns to process 884 for continued monitoring of the channel. Alternately, if the channel has changed since the last explicit sounding by more than the threshold amount then control is passed to process 890. In process 890 the receiver feeds forward to the transmitter indicia of the change in CSI between the transmitter and receiver. In alternate embodiments of the invention that indicia may comprise any one or all of the following: a) the current channel matrix "H"; b) the beamforming matrix "V" and sigma "Σ" or other indicator of the received signal-to-noise ratio (SNR); c) a condensed form of either the channel or beamforming matrices pertaining information only as to those coefficients which have changed significantly; and d) a change notification only, without any indication of the amount of the change itself. Control then returns to process 870 for the detection of the next explicit sounding. In an alternate embodiment of the invention where the feedforward includes detailed channel or beamforming matrix information, i.e. options a-c, control may alternately return to process 882 for continued monitoring and proactive notification of the transmitter when there is a substantial change in the channel. In an embodiment of the invention where the indicia of channel change contains no quantifying information the transmitter may simply effect an immediate explicit channel sounding, or increase the frequency of explicit channel soundings, or transition from multi-user (MU) MIMO transmission to single user (SU) MIMO transmission.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless transceiver apparatus for a wireless local area network (WLAN) supporting wireless communications of associated wireless transceivers on a selected communication channel, and the wireless transceiver apparatus comprising:
a plurality of antenna;
a plurality of components coupled to one another to form transmit and receive chains each coupled to a corresponding one of the plurality of antenna for multiple-input multiple-output (MIMO) wireless communications on orthogonal frequency division multiplexed (OFDM) tones of the selected communication channel;
a sounding feedback module coupled to the plurality of components, and responsive to reception by the receive path components of an explicit channel sounding packet from an other one of the transceivers on the WLAN to transmit a sounding feedback packet of multiple-input multiple-output (MIMO) channel state information (CSI) derived from the explicit channel sounding packet to the other one of the transceivers; and
a sounding feedforward module coupled to the plurality of components to monitor CSI derived from subsequent user data packets received from the other one of the transceivers and responsive to a determination of a change above a threshold amount in the monitored CSI relative to the CSI derived from the last explicit sounding packet to transmit to the other one of the transceivers an indicia of the change in CSI; thereby reducing explicit sounding overhead by proactively notifying the other one of the transceivers when a new explicit sounding is needed.

2. The wireless transceiver apparatus of claim 1, further comprising:
the sounding feedforward module further derives CSI from a training field in a header portion of the subsequently received user data packets.

3. The wireless transceiver apparatus of claim 1, further comprising:
the sounding feedforward module wherein the indicia of change in CSI includes at least one of: a MIMO beamsteering matrix "V", a MIMO channel matrix "H"; and a received signal strength indicator (RSSI).

4. The wireless transceiver apparatus of claim 1, further comprising:
the sounding feedforward module wherein the indicia of change in CSI includes a notification that the CSI has changed without any further information quantifying said change.

5. The wireless transceiver apparatus of claim 1, further comprising:
the sounding feedforward module wherein the indicia of change in CSI includes a communication limited to quantifying only changes in at least one of the channel matrix "H" and the beamforming matrix "V" since the feedback to the last explicit sounding.

6. The wireless transceiver apparatus of claim 1, operative on the WLAN as at least one of: a wireless access point (WAP) transceiver and a station transceiver.

7. The wireless transceiver apparatus of claim 1, wherein the explicit sounding packet and user data packet conform with an IEEE 802.11 standard.

8. A method for operating a $1^{st}$ transceiver on a wireless local area network (WLAN) supporting wireless communications of associated transceivers on a selected communication channel, and the method comprising:
receiving at the $1^{st}$ transceiver an explicit channel sounding packet from a $2^{nd}$ one of the transceivers;
transmitting to the $2^{nd}$ one of the transceivers a sounding feedback packet of multiple-input multiple-output (MIMO) channel state information (CSI) derived from the explicit channel sounding packet received in the receiving act;
storing on the $1^{st}$ transceiver the MIMO CSI transmitted in the last explicit sounding feedback packet;
monitoring changes in CSI since the last explicit sounding based on CSI determined from the subsequently received user data packets of from the $2^{nd}$ one of the transceivers;
comparing the MIMO CSI stored in the storing act to the CSI determined in the monitoring act for a change in CSI above a threshold amount; and
transmitting to the $2^{nd}$ one of the transceivers a sounding feedforward packet including indicia of the change in CSI, responsive to a determination in the comparing act of a change in CSI above the threshold amount; thereby reducing explicit sounding overhead by proactively notifying the other one of the transceivers when a new explicit sounding is needed.

9. The method for operating the $1^{st}$ transceiver of claim 8, wherein the monitoring act further comprises:
determining CSI from a training field in a header portion of the subsequently received user data packets from the $2^{nd}$ one of the transceivers.

10. The method for operating the $1^{st}$ transceiver of claim 8, wherein the indicia of change in CSI in the sounding feedforward packet includes at least one of: a MIMO beamsteering matrix "V", a MIMO channel matrix "H"; and a received signal strength indicator (RSSI).

11. The method for operating the $1^{st}$ transceiver of claim 8, wherein the indicia of change in CSI in the sounding feedforward packet includes a notification that the CSI has changed without any further information quantifying said change.

12. The method for operating the $1^{st}$ transceiver of claim 8, wherein the indicia of change in CSI in the sounding feedforward packet includes a communication limited to quantifying only changes in at least one of the channel matrix "H" and the beamforming matrix "V" since the last explicit sounding.

13. The method for operating the $1^{st}$ transceiver of claim 8, further comprising:
performing the acts on at least one of: a wireless access point (WAP) transceiver, and a station transceiver.

14. The method for operating the $1^{st}$ transceiver of claim 8, wherein the explicit sounding packet and the user data packet conform with an IEEE 802.11 standard.

15. A non-transitory computer readable medium containing program instructions for causing a wireless transceiver to perform the method of:
receiving an explicit channel sounding packet from another wireless transceiver;
transmitting to the other wireless transceiver a sounding feedback packet of multiple-input multiple-output (MIMO) channel state information (CSI) derived from the explicit channel sounding packet received in the receiving act;
storing on the $1^{st}$ transceiver the MIMO CSI transmitted in the last explicit sounding feedback packet;

monitoring changes in CSI since the last explicit sounding based on CSI determined from subsequently received user data packets from the other one of the transceivers;

comparing the MIMO CSI stored in the storing act to the CSI determined in the monitoring act for a change in CSI above a threshold amount; and transmitting to the other one of the transceivers a sounding feedforward racket including indicia of the change in CSI, responsive to a determination in the comparing act of a change in CSI above the threshold amount; thereby reducing explicit sounding overhead by proactively notifying the other one of the transceivers when a new explicit sounding is needed.

16. The non-transitory computer readable medium containing program instructions of claim 15 for causing the wireless transceiver to further perform the method of:

determining CSI from a training field in a header portion of the subsequently received user data packets received from the other one of the transceivers.

\* \* \* \* \*

UNITED STATES PATENT AND TRADEMARK OFFICE
CERTIFICATE OF CORRECTION

| | | |
|---|---|---|
| PATENT NO. | : 9,698,878 B2 | Page 1 of 1 |
| APPLICATION NO. | : 14/741419 | |
| DATED | : July 4, 2017 | |
| INVENTOR(S) | : Sigurd Schelstraete et al. | |

It is certified that error appears in the above-identified patent and that said Letters Patent is hereby corrected as shown below:

In the Claims

In Claim 15 Column 33, Line 8 Please delete "racket" and insert -- packet --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*